United States Patent [19]
Van Wonterghem

[11] Patent Number: 5,951,660
[45] Date of Patent: Sep. 14, 1999

[54] CURRENT CONTROL INTERFACE ARRANGEMENT

[75] Inventor: Geert Arthur Edith Van Wonterghem, Eeklo, Belgium

[73] Assignee: Alcatel Alsthom Compagnie Generale d'Electricite, Paris, France

[21] Appl. No.: 08/987,949

[22] Filed: Dec. 10, 1997

Related U.S. Application Data

[60] Provisional application No. 60/052,111, Jul. 11, 1997.

[30] Foreign Application Priority Data

Dec. 12, 1996 [EP] European Pat. Off. .............. 96402722

[51] Int. Cl.$^6$ ...................................................... G06F 13/00
[52] U.S. Cl. .................................. 710/103; 361/58; 361/9
[58] Field of Search ................................ 361/58, 9, 111; 710/103

[56] References Cited

U.S. PATENT DOCUMENTS

| | | | |
|---|---|---|---|
| 4,245,270 | 1/1981 | Busby | 361/58 |
| 5,077,675 | 12/1991 | Tam | 364/480 |
| 5,283,707 | 2/1994 | Conners et al. | 361/58 |

*Primary Examiner*—Ayaz R. Sheikh
*Assistant Examiner*—David A. Wiley
*Attorney, Agent, or Firm*—Ware, Fressola, Van Der Sluys & Adolphson LLP

[57] ABSTRACT

A current control interface arrangement includes a card circuit and a connector means. The connector means is adapted to generate, from the supply voltage terminals, an enable signal which is directly correlated to the moment of insertion or extraction of the load from the power supply. The card circuit includes an active device to be coupled between a power supply terminal and a load, an enable controlled switch for delivering the correct voltage to the control terminal of the active device for turning on, respectively turning off this device and a time constant means for controlling the rate at which the active device is further rendered conductive. A very simple power supply sequencing apparatus including the current control interface arrangement allows for coupling a plurality of supply voltages to a card in descending order starting from the highest supply voltage to the lowest supply voltage.

17 Claims, 5 Drawing Sheets

CURRENT CONTROL INTERFACE ARRANGEMENT

CLAIM OF PRIORITY UNDER 35 USC §119

This application claims priority under 35 USC §119(e) from U.S. Provisional Application Ser. No. 60/052,111, filed Jul. 11, 1997 and under 35 USC §119(a) from European Application 96 402722 filed Dec. 12, 1996.

BACKGROUND OF THE INVENTION

1. Technical Field of the Invention

The present invention relates to a current control interface arrangement including a card circuit and a connector means

2. Discussion of Related Art

Such a current control interface arrangement and more particularly the card circuit therein, is already known in the art, e.g. from the U.S. Pat. No. 5,283,707, by Conners et al, "Inrush current limiting circuit". Therein, an arrangement is described including a backplane having at least two conductors, a power supply connected to the conductors and a plurality of circuit cards attached to the backplane and connected to the conductors, whereby each of the plurality of circuit cards includes an inrush current limiting circuit. This inrush current limiting circuit includes input terminals for connection to a power supply output and to a reference potential, output terminals for connection to a load, an enable terminal for receiving an enable signal, and an active device having a control electrode and a conductive controlled path which is connected between the power input terminal and a respective one of the output terminals. A voltage supply means, connected to the enable terminal and the reference potential input terminal, and having an output for providing sufficient voltage to render the active device conductive, is included in the inrush current limiting circuit as well. This inrush current limiting circuit further includes a first time constant means, coupled between the voltage supply means and the control electrode, for controlling the rate at which the active device is rendered conductive in accordance with a predetermined time constant, and second time constant means coupled between the voltage supply means and the control electrode for rendering the active device non-conductive in accordance with a second predetermined time constant.

During hot insertion of the circuit card into the backplane, the active device conductive controlled path between its source and drain terminals is initially in a high impedance state. When an enable signal comprising a DC voltage, approximately equal to or less than 0.5 V DC below the level of the power supply input, being nominally 5 V DC, is applied to the enable input, the voltage supply is turned on and provides an output voltage of between approximately 10 to 12 V to the power-up time constant circuit, which then further controls the rate of change of the voltage applied to the control electrode of the active device, in the prior art solution being a n-type FET switch. During the extraction procedure of the circuit board from the backplane module first the enable input voltage is removed from the enable input. The power down time constant circuit discharges the control electrode of the active device, thereby controlling the rate of power supply unloading, after which the circuit board can be removed from the backplane.

The prior art solution with the enable functionality thus requires an extra externally controlled enable signal line per card, as well as a voltage supply on each card. The necessity to provide such an extra externally controlled enable signal on each card represents an extra cost. Similarly, the presence of such a voltage supply in the current limiting circuit, which is placed on each card, also implies an extra cost.

SUMMARY OF INVENTION

An object of the present invention is to provide a current control interface arrangement of the above known type but omitting the need for a separate enable signal on each card, while still preserving the enable functionality, as well as the need of such an expensive voltage supply means.

According to a first aspect of the invention, a current control interface arrangement for controlling a current flowing through a load and through a board power supply when coupling and decoupling said load to and from said board power supply respectively, said current control interface arrangement including a card circuit and a connector means, said card circuit including a first input terminal and a second input terminal to be coupled to a board power supply output terminal and a board reference terminal respectively of said board power supply, via said connector means, a power supply output terminal, and a reference output terminal to be coupled to a load power supply terminal and to a load reference terminal respectively, of said load, an enable input terminal, an active device having a control electrode and a conductive controlled path which is coupled between said first input terminal and said power supply output terminal, time constant means having a first time constant means terminal coupled to said control electrode of said active device, a second time constant means terminal coupled to said second input terminal, and a third time constant means terminal, said time constant means controlling the rate at which said active device is rendered conductive in accordance with a predetermined time constant, and including a resistor coupled to a capacitor, is characterized in that said enable input terminal is to be coupled to and decoupled from said board power supply output terminal via said connector means, said connector means is adapted to first couple said reference input terminal of said card circuit to said board reference terminal, next couple said first input terminal of said card circuit to said board power supply output terminal, and finally couple said enable input terminal to said board power supply output terminal during said coupling of said load to said board power supply, and that said connector means is further adapted to first decouple said enable terminal from said board power supply output terminal, next decouple said first input terminal from said board power supply output terminal, and finally decouple said second input terminal from said board reference terminal during said decoupling of said load from said board, said third time constant means terminal is coupled to said first input terminal of said card circuit, said capacitor of said time constant means is coupled between said third time constant means terminal and said first time constant means terminal, said resistor of said time constant means is coupled between said second time constant means terminal and said first time constant means terminal, said card circuit further includes an enable controlled switch coupled between said enable input terminal being a control terminal of said enable controlled switch, said first input terminal of said card circuit being a fixed terminal of said enable controlled switch, and said first time constant means terminal, being an output terminal of said enable controlled switch, said enable controlled switch being closed if said enable input terminal is decoupled from said board power supply output terminal, said enable controlled switch being open, if said enable input terminal is coupled to said board power supply output terminal.

In this way, the appropriate voltage level for turning on, respectively turning off the active device, is provided to its control electrode by both the time constant circuit RC and an enable controlled switch, SW. The latter circuit receives at its control terminal an enable signal, which is directly correlated to the hot-insertion or hot-extraction event, thanks to the special construction of the connector means. Indeed, during hot insertion of the card into the board, the enable input terminal is coupled to the board power supply output terminal, as was the first input terminal of the card circuit. The coupling of the enable input terminal occurs however with some delay with respect to the coupling of the first input terminal to the board power supply output terminal. Therefore, the enable signal has some delay with respect to the power supply signal at the first input terminal. Similarly, during extraction of the card from the board, first the enable input terminal is disconnected from the board power supply output terminal, before the disconnection of the first input terminal from the same board power supply output terminal. In this way an enable signal is generated, correlated to the hot-insertion or hot-extraction event, but without the need of a separate enable signal line, which is a serious advantage compared to the prior art solution.

The function of the enable controlled switch is to appropriately convert the thus created enable signal, for delivering the correct voltage to the control terminal of the active device T1, for turning on, respectively turning off this device. Indeed, before and at the first instances of the hot-insertion event, the enable terminal is open, closing said enable controlled switch, its output terminal thus being coupled to the first input terminal of the card circuit. This same output terminal is coupled to the control terminal, G, of the active device, and to the first terminal of the time constant means RC. Since the capacitor C1 of the time constant means, coupled in parallel with the inherent control capacitor of the active device, being for instance the gate-source capacitor of a MOSFET transistor or the base-emitter capacitance of a bipolar transistor, was already discharged, the active device remains off. Next, when the enable input terminal is coupled to the power supply output terminal, the enable controlled switch opens, and will thus no longer influence the control voltage of the active device. From this moment on, the time constant means controls the rate at which the active device is turned on. The capacitor of the time constant means gradually charges with a time constant defined by the product of the capacitance value of its capacitor C1, and the resistance value of its resistor, R2, thus gradually turning on the active device with the same time constant.

Similarly, during the hot-extraction event, first the enable input terminal is disconnected, resulting in closing of the enable controlled switch. The output terminal of this enable controlled switch, coupled to the control terminal of the negative on pass-gate, is thus coupled to the first input terminal, thereby discharging the capacitor C1, switching off the active device since its inherent control capacitor is coupled in parallel to the capacitor C1 of the time constant means.

It becomes clear that both during hot insertion and hot extraction events, no extra supply voltage means, generating a voltage of about twice the supply voltage, is needed anymore, thereby realizing a very cheap arrangement compared to this of the prior art.

According to a second aspect of the invention, a current control interface arrangement for controlling a current flowing through a load and through a board power supply when coupling and decoupling said load to and from said board power supply respectively, said current control interface arrangement including a card circuit and a connector means, said card circuit including a first input terminal and a second input terminal to be coupled to a board power supply output terminal and a board reference terminal respectively of said board power supply, via said connector means, a power supply output terminal and a reference output terminal to be coupled to a load power supply terminal and to a load reference terminal respectively, of said load, an enable input terminal, an active device having a control electrode and a conductive controlled path which is coupled between said first input terminal and said power supply output terminal, time constant means having a first time constant means terminal coupled to said control electrode of said active device, a second time constant means terminal, and a third time constant means terminal, said time constant means controlling the rate at which said active device is rendered conductive in accordance with a predetermined time constant, and including a resistor coupled to a capacitor, is characterized in that said card circuit includes a fourth input terminal to be coupled via said connector means to an auxiliary voltage board terminal, said enable input terminal is to be coupled to and decoupled from said board power supply output terminal, via said connector means, said connector means is adapted to first couple said reference input terminal of said card circuit to said board reference terminal, next couple said first input terminal of said card circuit to said board power supply output terminal simultaneously with the coupling of said fourth input terminal of said card circuit to said auxiliary voltage board terminal, and finally couple said enable input terminal to said board power supply output terminal during said coupling of said load to said board power supply, and that said connector means is further adapted to first decouple said enable terminal from said board power supply output terminal, next decouple said first input terminal from said board power supply output terminal simultaneously with decoupling said fourth input terminal from said auxiliary voltage board terminal, and finally decouple said second input terminal from said board reference terminal during said decoupling of said load from said board, said third time constant means terminal is coupled to said first input terminal of said card circuit, said second time constant means terminal is coupled to said fourth input terminal, said capacitor of said time constant means is coupled between said third time constant means terminal, and said first time constant means terminal, and said resistor of said time constant means is coupled between said second time constant means terminal and said first time constant means terminal, said card circuit further includes an enable controlled switch coupled between said enable input terminal being a control terminal of said enable controlled switch, said first input terminal of said card circuit being a fixed terminal of said enable controlled switch, and said first time constant means terminal, being an output terminal of said enable controlled switch, said enable controlled switch being closed if said enable input terminal is decoupled from said board power supply output terminal, said enable controlled switch being open, if said enable input terminal is coupled to said board power supply output terminal.

In this way, a more complex embodiment, requiring one auxiliary voltage board terminal, one extra input terminal of the card circuit, and one extra connector pin, is provided for the arrangement, while basically keeping the same architecture for the card circuit as the one previously described, thus without the need for an extra enable signal, and a separate voltage supply. The advantages of such an embodiment are that, by the coupling of the second time constant means terminal to this fourth input terminal, the voltage across the capacitor of the time constant means, in parallel with the control capacitor of the active device, is increased, resulting in a lower inherent resistance of this active device, when conducting, thereby resulting in less power dissipation of this device as will be explained in a later paragraph. Another advantage of such an embodiment is that, by the presence of the fourth input terminal, which is to be coupled to an auxiliary voltage board terminal, in the case of a positive voltage supplied by the board power supply output terminal with respect to the voltage provided by the board reference terminal, also an embodiment of the card circuit, using an n-type transistor for the active device can be used, as will be also explained more into detail in a further paragraph. At the time of the invention, an n-type power FET transistor is cheaper than a p-type power FET, and, for the same size of devices, an n- type power FET has a lower on-resistance than a p-power FET. Another advantage of such an embodiment is that, also in case of a positive voltage provided by the board power supply output terminal with respect to the voltage provided by the board reference terminal, a very simple power supply sequencing apparatus including such an embodiment of a current control interface arrangement can be realised, as will be explained during the discussion of the power supply sequencing apparatus of which the current control interface forms part.

In further accord with either the first or second aspect of the invention, the enable controlled switch includes a switching means, a control terminal of said switching means constituting said control terminal of said enable controlled switch, a variable terminal of said switching means constituting said output terminal of said enable controlled switch, a fixed terminal of said switching means being coupled to said first input terminal, said enable controlled switch further including an input resistor coupled between said enable input terminal and said second input terminal of said card circuit.

In further accord with the second aspect of the invention, the enable controlled switch includes a switching means, a control terminal of said switching means constituting said control terminal of said enable controlled switch, a variable terminal of said switching means constituting said output terminal of said enable controlled switch, a fixed terminal of said switching means being coupled to said first input terminal, said enable controlled switch further including an input resistor coupled between said enable input terminal and said fourth input terminal of said card circuit.

In this way a very simple circuit embodiment for the enable controlled switch is realized. Indeed, if the enable input terminal is not connected, the input resistor of the enable controlled switch brings the potential at the control terminal of the switching means at either the reference potential or either at the potential provided by the auxiliary voltage board terminal thereby turning on this switching means, which then acts as a closed switch coupled to the first input terminal. Similarly, if the enable input terminal is coupled to the board power supply output terminal, after the hot-insertion event, the switching means stops conducting, thus opening the switch.

The two alternative embodiments of this enable controlled switch, as stated above, refer to the coupling of the input resistor of the enable controlled switch, to either the second input terminal, or to the fourth input terminal. This difference slightly influences the rate at which the switching means of the enable controlled switch, is turned on, when the enable signal is disconnected, thus also the rate at which the active device of the card circuit will be turned off during the extraction event, as will be explained in a further paragraph.

In still further accord with either the first or second aspects of the invention, the enable controlled switch further includes a source degeneration resistance coupled between said fixed terminal of said switching means and said first input terminal of said card circuit.

In this way, during hot extraction conditions, the addition of this extra source degeneration resistor in the enable controlled switch, provides, together with the capacitor of the time constant means, for an additional low-pass RC filter, determining the rate at which the active device will be switched off. This fact presents an additional advantage of the card circuit of the present invention, namely that also the need for an extra power-down time constant circuit, as was included in the prior art solution, has disappeared, since the source degeneration resistor of the enable controlled switch circuit itself, together with the capacitor of the time constant circuit, is now providing for a smooth controlled transition from the conducting state of the active device towards the non-conductive state of this device during extraction situation. One may thus conclude that a very cheap solution is provided compared to the prior art. In addition, the presence of this source degeneration resistor will result in a limitation of the current through the p-type switching means of the enable controlled switch during the extraction event, and will, together with the capacitor of the time constant means, also result in the damping of possible high frequency noise pulses that might appear on the input terminals, especially the enable input terminal, of the card circuit during the de-coupling event.

According to a third aspect of the present invention, a power supply sequencing apparatus including at least one current control interface arrangement according to the first aspect of the invention is characterized in that said active device is a negative-on pass gate and that said switching means is a negative-on switching means, in that said board power supply output terminal is for delivering a voltage that is more positive with respect to the voltage delivered by said board reference terminal, in that said card circuit further includes a third output terminal coupled to said control electrode of said active device, in that said card circuit forms part of a power supply sequencing circuit, said power supply sequencing circuit receiving a first plurality of n distinct positive supply voltages with respect to said voltage delivered by said board reference terminal, at a corresponding first plurality of n distinct positive supply voltage input terminals, said power supply sequencing circuit further receiving a reference voltage at a reference input terminal coupled to said second input terminal of said card circuit, and an enable voltage at an enable terminal of said power supply sequencing circuit, being coupled to said enable input terminal of said card circuit, one terminal comprised within said first plurality receiving the most positive input voltage, being coupled to said first input terminal of said card circuit, said power supply sequencing circuit further including a second plurality of n−1 similar negative-on pass gates, each of said similar negative-on pass-gates comprised in said second plurality being similar to said negative-on pass-gate and having a control terminal coupled to said third output terminal of said card circuit, a second terminal coupled to a distinct terminal comprised in said first plurality, except for said one terminal of said first plurality receiving said most positive supply voltage, and a third terminal constituting an output terminal included in a third plurality of n−1 distinct positive supply voltage output terminals of said power supply sequencing circuit, said reference output terminal of said card circuit being coupled to a reference voltage output terminal of said power supply sequencing circuit, said power supply output terminal of said card circuit being coupled to a further output terminal of said power supply sequencing circuit, in that said connector means is further adapted to simultaneously couple, respectively decouple, each of said n distinct positive supply voltage input terminals of said power supply sequencing circuit comprised within said first plurality, to, respectively from, a corresponding fourth plurality of n distinct positive supply voltage board output terminals, said board power supply output terminal being included in said fourth plurality, and being adapted to deliver said most positive supply voltage to said power supply sequencing apparatus via said connector means.

According to a fourth aspect of the invention, a power supply sequencing apparatus including at least one current control interface arrangement according to the second aspect of the invention is characterized in that the active device is a negative-on pass gate and said switching means is a negative-on switching means, in that said auxiliary voltage board terminal is delivering a voltage that is more negative with respect to the voltage delivered by said board power supply output terminal, in that said card circuit further includes a third output terminal coupled to said control electrode of said negative on pass-gate, in that said card circuit forms part of a power supply sequencing circuit, said power supply sequencing circuit receiving a first plurality of n distinct supply voltages, including one supply voltage at the value delivered by said board power supply output terminal and including n−1 distinct supply voltages with values lower than the voltage delivered by said board power supply output terminal and higher than the voltage delivered by said auxiliary voltage board terminal at a corresponding first plurality of n distinct supply voltage input terminals, said power supply sequencing circuit further receiving a reference voltage at a reference input terminal coupled to said second input terminal of said card circuit, and an enable voltage at an enable terminal of said power supply sequencing circuit, being coupled to said enable input terminal of said card circuit, one terminal comprised within said first plurality receiving the said voltage delivered by said board power supply output terminal being coupled to said first input terminal of said card circuit, said power supply sequencing circuit further including a second plurality of n−1 similar negative-on pass-gates, each of said similar negative-on pass-gates comprised in said second plurality being similar to said negative-on pass-gate and having a control terminal coupled to said third output terminal of said card circuit, a second terminal coupled to a distinct terminal comprised in said first plurality, except for said one terminal of said first plurality receiving said most positive supply voltage, and a third terminal constituting an output terminal included in a third plurality of n−1 distinct supply voltage output terminals of said power supply sequencing circuit, said reference output terminal of said card circuit being coupled to a reference voltage output terminal of said power supply sequencing circuit, said power supply output terminal of said card circuit being coupled to a further output terminal of said power supply sequencing circuit, in that said connector means is further adapted to simultaneously couple, respectively decouple, each of said n distinct supply voltage input terminals of said power supply sequencing circuit comprised within said first plurality, to, respectively from, a corresponding fourth plurality of n distinct supply voltage board output terminals, said board power supply output terminal being included in said fourth plurality and being adapted to deliver its power supply voltage to said one terminal of said first plurality, via said connector means.

In this way, the current control interface arrangement forms part of a very simple power supply sequencing apparatus, resulting in a certain sequence during powering up different voltage supply lines on a card, during the insertion of this card in a backplane, and for controlled powering off the same different voltage supply lines on the same card, during the extraction event, before decoupling this card from the backplane. This sequence during hot-insertion is that first the reference potential is passed through, followed by the supply voltages, that are all more positive than said reference potential, in descending order starting with the most positive voltage and ending with the smallest positive voltage. This sequence is needed in these applications where, for instance, several electrical components working at different supply voltage values, for instance 5 V and 3.3 V, are present on the same card, as will be described more into detail in a further paragraph.

The power supply sequencing apparatus of the present invention, in an embodiment where the voltage provided by the board power supply output terminal is positive with respect to the reference voltage provided by the board reference terminal, provides this feature. Because of the relative polarity of the input voltages at the input terminals of the current control interface arrangement included therein, a negative-on pass gates is required for the active device and for the switching means has to be a p-type switching means. Indeed, the control terminal G of the negative-on pass-gate now also serves as control terminal of each of the similar pass gates included in the second plurality. By the operation of the card circuit all these control terminal voltages are gradually pulled down together, towards the lowest voltage present in the cord circuit. Consequently all these negative-on pass-gates, one of their conductive terminals being coupled to the distinct input positive supply voltage input terminals which simultaneously receive their respective distinct positive supply voltages, will pass through these voltages to their respective other conductive terminals, being the output terminals of the power supply sequencing circuit, in this desired sequence. Indeed, similar negative-on pass-gates, having similar threshold voltages, only start passing through when their control voltages become this constant threshold voltage lower than the voltage at one of their conductive terminals. This means that, with equal control voltages, the lower the positive power supply voltage at one of the conductive terminals is, the later it will be passed.

Similarly, during the extraction event, the voltage at all control terminals is gradually raised to the most positive supply voltage, thereby gradually turning off all similar negative-on pass-gates, before the connection is interrupted. Since all control terminals receive the some voltage values, and since all negative-on pass-gates are similar, the negative-on pass-gate coupled to the board power supply output terminal providing the smallest positive voltage, will be first switched off, followed by the negative-on pass-gate coupled to the board power supply output terminal providing the smallest but one positive voltage value, and so on, until also the negative-on poss-gate T1 of the card circuit, coupled to the board power supply output terminal providing the most positive supply voltage, is switched off. Again, this sequence is desirable as will be explained in a later paragraph.

In further accord with the fourth aspect of the invention, the power supply sequencing apparatus is characterized in that it further receives an auxiliary supply voltage equal to the value delivered by said auxiliary voltage board terminal at a corresponding auxiliary supply input terminal of said power supply sequencing circuit, being coupled to said fourth input terminal of said card circuit, said power supply sequencing circuit further including an additional switch circuit coupled between said auxiliary supply input terminal and an auxiliary output terminal of said power supply sequencing circuit, said additional switch circuit being adapted to provide said auxiliary supply voltage to said auxiliary output terminal with a larger delay compared to the delivery of said n−1 distinct supply voltages lower than the value delivered by said board power supply output terminal at said third plurality of n−1 distinct supply voltage output terminals, and to decouple said auxiliary output terminal from said auxiliary supply input terminal, before all similar pass gates of said second plurality are open, in that said connector means is further adapted to simultaneously couple, respectively decouple, said auxiliary supply voltage input terminal to said auxiliary voltage board terminal during the coupling, respectively decoupling, of said n distinct supply voltage input terminals of said first plurality to said corresponding fourth plurality of n distinct supply voltage board output terminals.

In this way the operation of the previously described power supply sequencing apparatus is extended towards negative supply voltages, in a similar way as was described above. After the reference voltage, the most positive supply voltage is passed through, followed by all others in descending order since the third output terminal of the cord circuit, which is fed to all control terminals of all similar negative-on pass-gates, is at the lowest potential present in the power supply sequencing apparatus. Only the most negative supply voltage cannot be passed through this way, since a similar negative on pass gate coupled similarly as the pass-gates of the sixth plurality, could never be turned on because its control voltage could never be lower than the voltage at the connected one of its conductive terminals, the latter condition however being a necessary requirement for turning on negative on pass-gates. Therefore a separate additional switch circuit is added to provide this most negative power supply voltage to the output terminals of the power supply sequencing apparatus. During extraction this switch circuit will also first decouple this most negative supply voltage, before all other negative supply voltages will be decoupled from their respective input terminals, thus again realizing the desired sequence for powering off the card, during extraction.

In still further accord with the fourth aspect of the invention, the power supply sequencing apparatus is further characterized in that said additional switch circuit includes a positive-on pass gate, a conductive path of which is coupled between said fourth terminal of said card circuit and said auxiliary output terminal of said power supply sequencing circuit, in that said additional switch circuit further includes an additional time constant means having a first additional time constant means terminal coupled to a control electrode of said positive-on pass gate, a second additional time constant means terminal coupled to said power supply output terminal of said card circuit, a third additional time constant means terminal coupled to said fourth input terminal of said card circuit, said additional time constant means being adapted for controlling the rate at which said positive-on pass gate is rendered conductive in accordance with a predetermined time constant, in that said additional switch circuit further includes a third card circuit output controlled switch, a control terminal of which is coupled to said third output terminal of said card circuit, a fixed terminal of which is coupled to said fourth input terminal of said card circuit, an output terminal of which is coupled to said control electrode of said positive-on pass gate.

In yet further accord with the fourth aspect of the invention, the power supply sequencing apparatus is further characterized in that said third card circuit output controlled switch includes an n-type switching means, a gate terminal of which constitutes said control terminal of said third card circuit output controlled switch, a first conductive path terminal of which is coupled via an additional source degeneration resistor to said fourth input terminal of said card circuit, a second conductive path terminal of which constitutes said output terminal of said third card circuit output controlled switch, in that said additional time constant means includes an additional resistor coupled between said second additional time constant means terminal and said first additional time constant means terminal, and an additional capacitor coupled between said first additional time constant means terminal and said third additional time constant means terminal.

In this way a simple architecture of such an additional switch is provided, which is very similar to the architecture of the card circuit itself, and including a third card circuit output terminal controlled switch, a positive-on pass-gate, and an additional time constant means. Since the voltage to be passed through is the most negative of all incoming voltages, an embodiment with positive-on pass gates is used. When the voltage at the third output terminal of the card circuit terminal is dropping, while the voltage at the power supply output terminal is rising, the n-type switching means of the third card circuit output terminal controlled switch included in this additional switch circuit, will be switched off, allowing the control voltage of the positive-on pass gate to gradually charge with a time constant determined by the capacitance value of the additional capacitor and the resistance value of the additional resistor. With this controlled delay, chosen to be larger than the intrinsic delay of the similar negative-on pass gates of the power supply sequencing circuit, the most negative power supply voltage is then passed through by this positive-on pass-gate, to the further negative output terminal Similarly, during extraction, the voltage appearing at the third output terminal of the card circuit, is slowly rising towards the most positive supply voltage, turning the n-type switching means of the additional switch circuit on after reaching its threshold voltage value. This n-type switching means will then force the voltage at the control terminal of the positive-on pass-gate of the additional switch circuit to drop with a time constant determined by the additional capacitor, the intrinsic resistance of the switching means itself, as well as the additional source degeneration resistor. By keeping the respective capacitance and resistance values of these components low, the positive-on pass-gate, and consequently the additional switch circuit itself will decouple the further negative output terminal from said one input terminal receiving said most negative supply voltage, before the remainder of the similar negative-on pass gates will be switched off.

BRIEF DESCRIPTION OF THE DRAWING

The mentioned and other objects and features of the invention will become more apparent and the invention itself will be best understood by referring to the following description of an embodiment taken in conjunction with the accompanying drawings wherein.

DETAILED DESCRIPTION OF PREFERRED EMBODIMENTS

Figure 1:
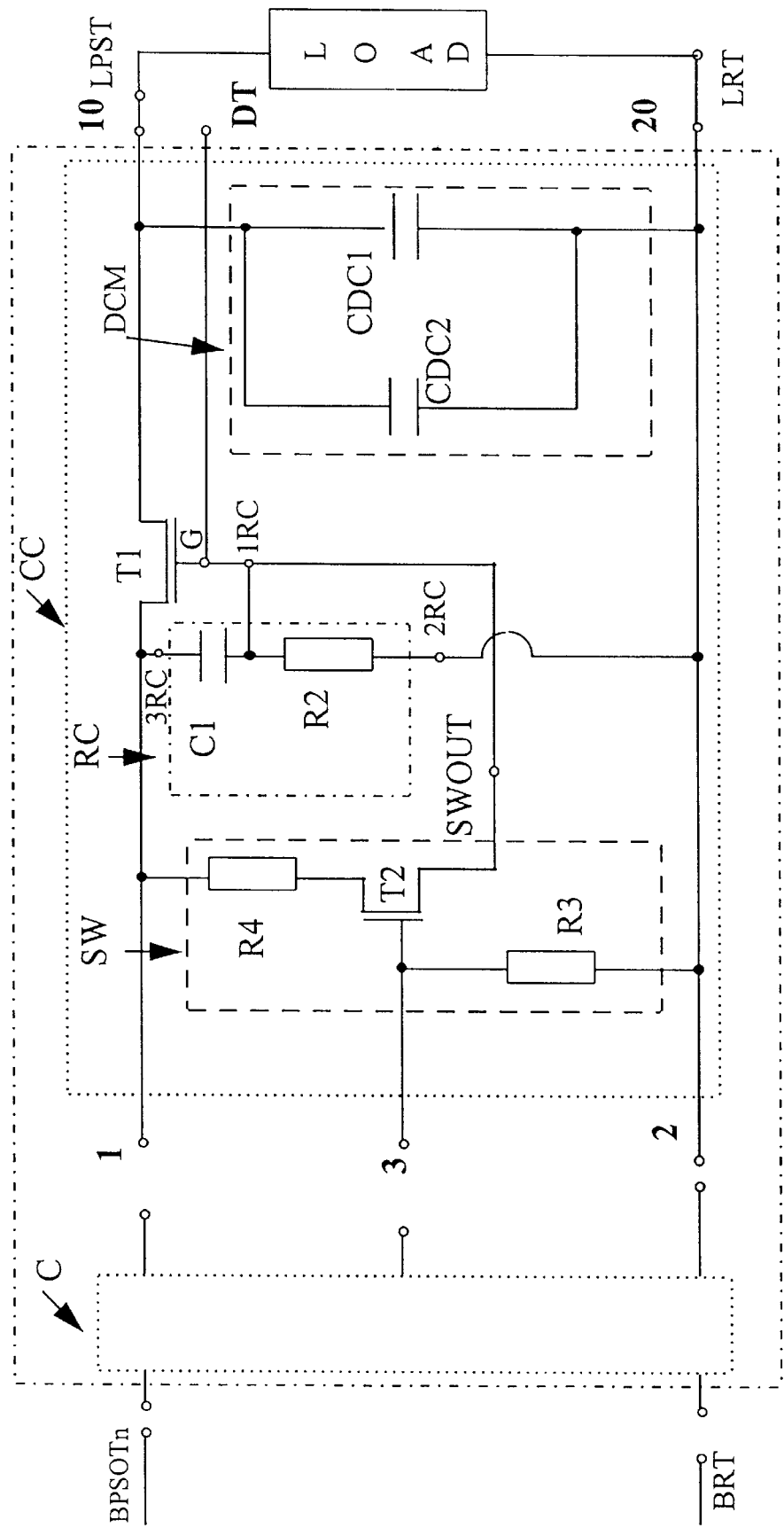
FIG. 1 shows an embodiment of a current control interface arrangement, denoted CCIA, according to the invention.

In systems, such as telecommunications systems, it is often necessary to exchange cards while the remaining circuit cards are in an operating state. When inserting or extracting a card to or from a backplane or board, several amperes can flow in the supply lines of the card, as well as in the board power supply of the backplane. If no precautions are taken, this board power supply, as well as the electronic circuitry on the card, can be damaged. Referring to FIG. 1, the electronic circuitry on the card is denoted by LOAD, and represented as an impedance coupled between a load power supply terminal, denoted with LPST, and a load reference terminal, denoted with LRT. During insertion of the card, of which the load forms part, into the backplane module, the load power supply terminal, LPST, is to be coupled to the power supply output terminal of the board power supply, denoted by BPSOTn, whereas the load reference terminal LRT, is to be coupled with the board reference terminal, denoted with BRT, of the same board power supply. During extraction or withdrawal of the card from the backplane, these couplings are to be interrupted. The present invention comprises a current control interface arrangement for controlling the current flowing through this load and through this power supply, during the hot-insertion and hot-extraction event, in order to prevent the load and the board power supply from being damaged during these events.

Referring to FIG. 1, a first embodiment of such a current control interface arrangement, denoted by CCIA, includes both a connector means, denoted with C, and a card circuit, denoted CC. The card circuit CC, in general, forms part of the same card as the one including the load, whereas one part of the connector means C, in general, is physically located at the backplane, whereas another part is physically located at the card.

The card circuit CC, as shown in FIG. 1, has a first input terminal, a second input terminal and an enable input terminal, respectively denoted by 1,2 and 3. The connector means serves to couple the first and the third input terminals of the card circuit CC to the board power supply output terminal BPSOTn, and the second input terminal of the card circuit to the board reference terminal BRT, as will be explained into more detail in a further paragraph. The card circuit CC further has a power supply output terminal, 10, being coupled to the load power supply terminal, LPST, whereas a reference output terminal 20 of the card circuit CC is coupled to the load reference terminal LRT. A third output terminal, denoted by DT, is only used in these embodiments where the current control interface arrangement forms part of a power supply sequencing apparatus, as will be described more into detail in a further paragraph.

During the insertion of the card into the backplane, the connector means C is adapted to first couple the reference input terminal 2 of the card circuit to the board reference terminal BRT, next couple the first input terminal 1 of the card circuit to the board power supply output terminal BPSOTn, and finally couple the enable input terminal 3 of the card circuit to the same board power supply output terminal BPSOTn. A commonly known embodiment of such a connector for performing such a coupling sequence, is a connector having pins of a different length. The longest pin will first make contact, followed by the pin with an intermediate pin length, and finally the shortest pin will make contact. This kind of embodiment will also result in the opposite sequence of decoupling during extraction of the board from the backplane module. Thus for the connector C of the current control interface arrangement CCIA of the present invention, during extraction of the card out of the backplane, first the enable input terminal 3 will be disconnected from the board power supply output terminal BPSOTn, followed by the first input terminal 1, and finally the second input terminal 2 of the card circuit will be decoupled from the board reference terminal BRT. This specific sequence during the coupling and the decoupling of the load to and from the board power supply, allows to generate an enable signal, being directly correlated to the insertion, respectively the extraction event, without the need for a special enable signal line on each card and an enable signal generation unit on the backplane. Indeed, the enable signal as present on the enable input terminal 3 of the card circuit CC, is either at the reference potential, provided by the board reference terminal BRT, as will be explained more into detail in a following paragraph, or either at the power supply potential provided by the board power supply output terminal BPSOTn. The moment of transition from the reference potential towards the power supply potential is defined by the moment of insertion of the card into the backplane, and the delay in the coupling sequence as determined by the connector means C. The moment of transition of the enable signal as present on the enable input 3 of the card circuit from the power supply potential towards the reference potential precedes the moment of extraction of the first input terminal from the board power supply output terminal with a certain lead time, again defined by the connector means.

Other embodiments of this connector means C are possible, as is well known by a person skilled in the art. An embodiment in which the enable input terminal of the card circuit will be coupled to the board reference terminal via an additional inverter circuit incorporated in the connector means, is a possible alternative.

The card circuit of FIG. 1 can be used for both positive as negative supply voltage values with respect to the reference voltage. Depending on the power supply voltage level with respect to the reference voltage however, a different embodiment has to be used. If the power supply voltage is positive with respect to the reference voltage, the active device T1 is a negative-on pass gate, and switching means T2 has to be a p-type switching means, for instance a pMOSFET transistor or a pnp bipolar transistor. If the power supply voltage is negative with respect to the reference voltage, the active device T1 is a positive-on pass gate, and switching means T2 has to be a n-type switching means, for instance a nMOSFET transistor or a npn bipolar transistor.

The remainder of the description of the current control interface arrangement CCIA of FIG. 1 will describe the embodiment for positive supply voltage values with respect to the reference potential, thus including negative-on active devices. The principle of operation, as well as the architecture and detailed implementation, are however completely identical for the embodiment including positive-on active devices, to be used for negative supply voltage values with respect to the reference potential. This will therefore not be described.

The card circuit of FIG. 1 thus includes a negative on pass-gate, denoted with T1, having a control electrode G, and a conductive controlled path which is coupled between the first input terminal 1 of the card circuit CC and the power supply output terminal 10 of this card circuit. A commonly known embodiment of such a negative-on pass-gate is a pMOS enhancement type power field-effect transistor, but other embodiments can be used which are known to a person skilled in the art.

The control electrode G of the negative-on pass-gate is coupled, both to a first time constant means terminal, 1RC, of a time constant means, RC, and to an output terminal SWOUT of an enable controlled switch, denoted by SW.

The time constant means RC further includes a second time constant means terminal, denoted by 2RC, a third time constant means terminal, denoted by 3RC, a resistor, denoted by R2 and coupled between the second time constant means terminal 2RC, and the first time constant means terminal, 1RC, and a capacitor, denoted by C1, coupled between the third time constant means terminal, 3RC, and the first time constant means terminal 1RC. In the embodiment of the card circuit as represented in FIG. 1, the third time constant means terminal 3RC is coupled to the first input terminal 1 of the card circuit CC, whereas the second time constant means terminal 2RC is coupled to the second input terminal 2 of the card circuit.

The function of this time constant means RC is to control the rate at which the negative-on pass-gate T1 is made conductive, after inserting the card into the backplane. For a p-type MOSFET embodiment of the negative-on pass-gate, this occurs by controlling the rate at which the gate-source capacitor of this p-type FET is charged to a negative voltage, for turning this transistor on. This will be explained more into detail during the description of the operation of the current control interface arrangement.

The enable controlled switch SW basically consists of a switch, one terminal of which is fixed and connected to the first input terminal 1 of the card circuit CC. When the switch is closed, the variable terminal, being the output terminal of the enable controlled switch, denoted by SWOUT, is thus coupled to this first input terminal 1 of the card circuit, to which the board power supply output terminal is coupled. When the switch is open, the potential at the output terminal SWOUT of the enable controlled switch SW, is thus defined by other circuitry connected to this terminal.

The control terminal of the enable controlled switch SW is the enable input terminal 3 of the card circuit. The enable controlled switch SW is open in case this enable input terminal 3 is coupled to the board power supply output terminal BPSOTn, whereas the enable controlled switch is closed if the enable input terminal 3 of the card circuit is decoupled from the board power supply output terminal.

An embodiment of such an enable controlled switch basically consists of a negative-on switching means, in FIG. 1 represented in the embodiment by a MOS transistor T2, its gate terminal coupled to the enable input terminal 3 of the card circuit CC, one of its conducting terminals, in general denoted as source terminal, being coupled to the first input terminal 1 of the card circuit CC, the other conducting terminal, in general denoted as drain terminal, being the output terminal SWOUT of the enable controlled switch SW. The gate terminal of the negative on switching means T2 is as well coupled to the second input terminal 2 of the card circuit, via an input resistor R3. In the embodiment shown in FIG. 1, a source degeneration resistance R4 is coupled between the first input terminal of the card circuit and the source terminal of the negative on switching means T2. This source degeneration resistance is not needed for the enable controlled switch for performing its previously described function. However, the addition of the source degeneration resistance has other benefits as will be explained more into detail in a further paragraph.

As can be further observed from FIG. 1, the card circuit also includes a decoupling capacitive means, denoted by DCM, coupled between the card circuit power supply output terminal 10 and the card circuit reference output terminal 20. In this way, high-frequency noise on the board power supply output terminal BPSOTn will be bypassed via this decoupling capacitive means, as is common knowledge for a person skilled in the art.

This decoupling capacitive means DCM consists of a parallel circuit of a first decoupling capacitive means CDC1 and a second decoupling capacitive means CDC2. The first decoupling capacitive means CDC1 is located relatively close to the card circuit power supply output terminal 10 and to the card circuit reference output terminal 20, whereas the second decoupling capacitive means CDC2, is located relatively close to the negative-on pass-gate T1. In this way, possible current pulses, associated with the plug-in of the card into the connector, that could normally destroy both the card circuit as well as the load circuit, are bypassed by means of these two decoupling capacitive means CDC1 and CDC2. The first decoupling capacitive means CDC1 serves to protect the load circuit, and is therefore placed relatively close to this load circuit, thus close to the card circuit power supply output terminal 10 and the card circuit load reference terminal LRT. The second decoupling capacitive means CDC2 serves to protect the card circuit itself, in particular the gate-substrate capacitance of the power FET means T1, and is therefore placed relatively close to this negative on pass-gate.

Moreover, both first decoupling capacitive means CDC1 and second decoupling capacitive means CDC2 each consist in their turn of two capacitors coupled in parallel, (not shown on FIG. 1), whereby each of these two capacitors have divergent capacitance values.

This further split serves to optimally conduct both relatively low-frequency as well as high frequency current pulses away from the sensitive circuits on the card circuit and on the load. Indeed, the low-frequency current pulses will be bypassed by the large capacitor having the largest capacitance value. Typically a value of 30 $\mu$F is used for an electrolyte type capacitor in one embodiment. For high frequency current pulses, a small capacitor is used, because of its low inherent parasitic resistance that could hamper the fast elimination of high frequency current pulses. A typical value of 100 nF is used for a tantalum type of capacitor.

The operation of the current control interface arrangement CCIA will now be described, still for the case of a positive power supply voltage delivered by the board power supply output terminal, BPSOTn, with respect to the reference voltage that is present at the board reference terminal, BRT A typical value is 5 V at BPSOTn and 0 V at BRT, but the reference value may as well be for instance −48 V, with the power supply voltage being -5 V, or 0 V.

During the insertion of the card into the backplane, first the second input terminal 2 of the card circuit, which is also directly coupled to the reference output terminal 20 of this card circuit, is coupled via the connector means C with the board reference terminal BRT. This is followed, after a typical delay time of 100 ms, determined by the construction of the connector means C, by the coupling of the first input terminal 1 to the board power supply output terminal BPSOTn. The current injection accompanying this voltage step, is limited via resistor R2, which therefore has a typical value of 100–200 KOhm.

By capacitor C1, the sudden connection of terminal 1 to the board power supply output terminal BPSOTn, the voltage at the gate of transistor T1, which is also the drain of transistor T2, is brought to the supply voltage. At this moment, terminal 3, is not yet connected to any terminal on the board, which leaves the enable controlled switch SW thus closed, its output terminal being coupled to the first input terminal of the card circuit, at the supply voltage potential. Indeed, the gate of the negative-on switching means, transistor T2, is coupled to the second input terminal 2 at the reference potential via resistor R3. Therefore T2 conducts, closing the switch consisting of this transistor T2. The drain terminal of T2 is coupled to the first input terminal of the card circuit via the source degeneration resistor R4. The current flowing in T2 is sunk via the resistor R2 of the time constant means RC to the ground. Since resistor R4 is much smaller than resistor R2 (typical values 50 Ohm for resistor R4 and 200 KOhm for resistor R2), the drain voltage of the pMOS switching means T2, being the control electrode of the negative on pass-gate T1, is thus approximately at the supply voltage level, keeping the negative-on pass-gate T1 off.

Due to the special construction of the connector, after some time again typically 100 ms, also terminal 3 is coupled to the board power supply output terminal BPSOTn at the backplane. This will turn off transistor T2, leaving the enable controlled switch open. From this moment on, the gate voltage of the negative-on pass-gate T1 is determined by the time constant means RC. For a pMOS-type embodiment of the negative-on pass-gate, with its relatively small gate-source capacitance coupled in parallel with the relatively large capacitor C1 of this time constant means RC, both capacitors are now charging to the supply voltage with a time constant determined by the product of the capacitance value of the capacitor C1 and the resistance value of the resistor R2, thus resulting in a gradual decrease of the gate voltage of the pMOS pass-gate T1, which will therefore gradually turn on. By the controlled turn on of the negative-on pass-gate, the voltage at terminal 10 will also gradually increase towards the supply voltage. This rate is of course also determined by the value of the decoupling capacitance means DCM, and the impedance of the load, as is well known by a person skilled in the art.

During extracting the card from the backplane, first the enable input terminal 3 is decoupled from the board power supply output terminal BPSOTn by the connector means C. Therefore input resistor R3 pulls down the gate voltage of transistor T2, resulting in a turn-on of this pMOS transistor. The presence of the source degeneration resistance R4, limits the current through this pMOS transistor T2 during this switching event, therefore preventing damage to this transistor T2. The voltage at the control terminal of the negative on pass-gate T1 will now rise quickly towards the supply voltage level, with a time constant determined by the product of the capacitance of the capacitor C1 of the time constant means and the resistance of this source degeneration resistance R4 of the enable controlled switch. In the absence of such a source degeneration resistor, the current through transistor T2 would not be limited enough, which could possibly damage this transistor, and the voltage rise at the control electrode of the negative on pass-gate would also not be controlled, which could again damage the load and induce spikes at the board power supply output terminal BPSOTn.

Because of the presence of both source degeneration resistor R4 in the enable controlled switch, and capacitor C1 in the time constant means, the negative-on pass-gate T1 will be gradually switched off, before the connector means interrupts the connection between the first input terminal 1 of the card circuit and the board power supply output terminal BPSOTn. The current in this branch between terminals 1 and 10 is thus already smoothly reduced to zero, before the board power supply is decoupled from the load. The interruption of the connection between the board power supply output terminal BPSOTn and the first input terminal 1 of the card circuit, con thus not induce any excess currents in the load since the current path to the load (via T1) is already open. This connection is then interrupted, typically after 100 ms, following the decoupling of input terminal 3 from BPSOTn.

Finally the coupling between the second input terminal 2 of the card circuit and the board reference terminal BRT will be interrupted.

The card circuit CC of the present invention also provides a solution for avoiding the influence of possible bouncing on the connector pins when opening or closing the connector means C. This bouncing represents high frequency pulses during coupling and decoupling the input terminal under consideration. Possible pulses at terminal 3 which could be forwarded to the gate of T1, are however filtered via the low-pass filter available by the presence of the source degeneration resistor R4 in the enable controlled switch, and the presence of capacitor C1 of the time constant means RC. Bouncing on terminal 1 will have no effect since, at this time, input terminal 3 is coupled to the second input terminal of the card circuit, leaving the negative on pass-gate off. Therefore no substantial currents, induced by the bouncing on terminal 1, can flow through the load.

Figure 2:
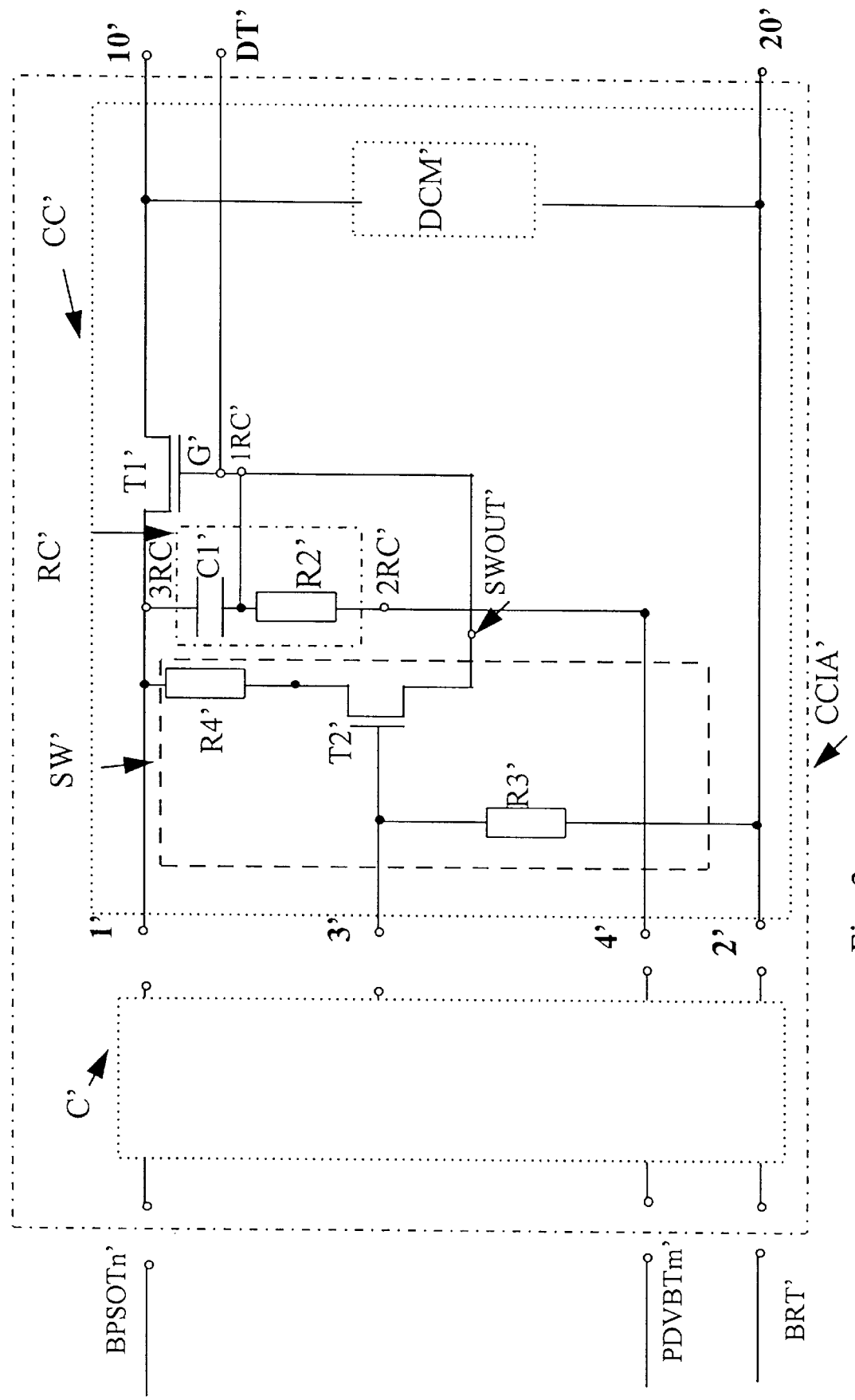
FIG. 2 shows a second embodiment of such a current control interface arrangement, denoted with CCIA', according to the invention.
Figure 3:
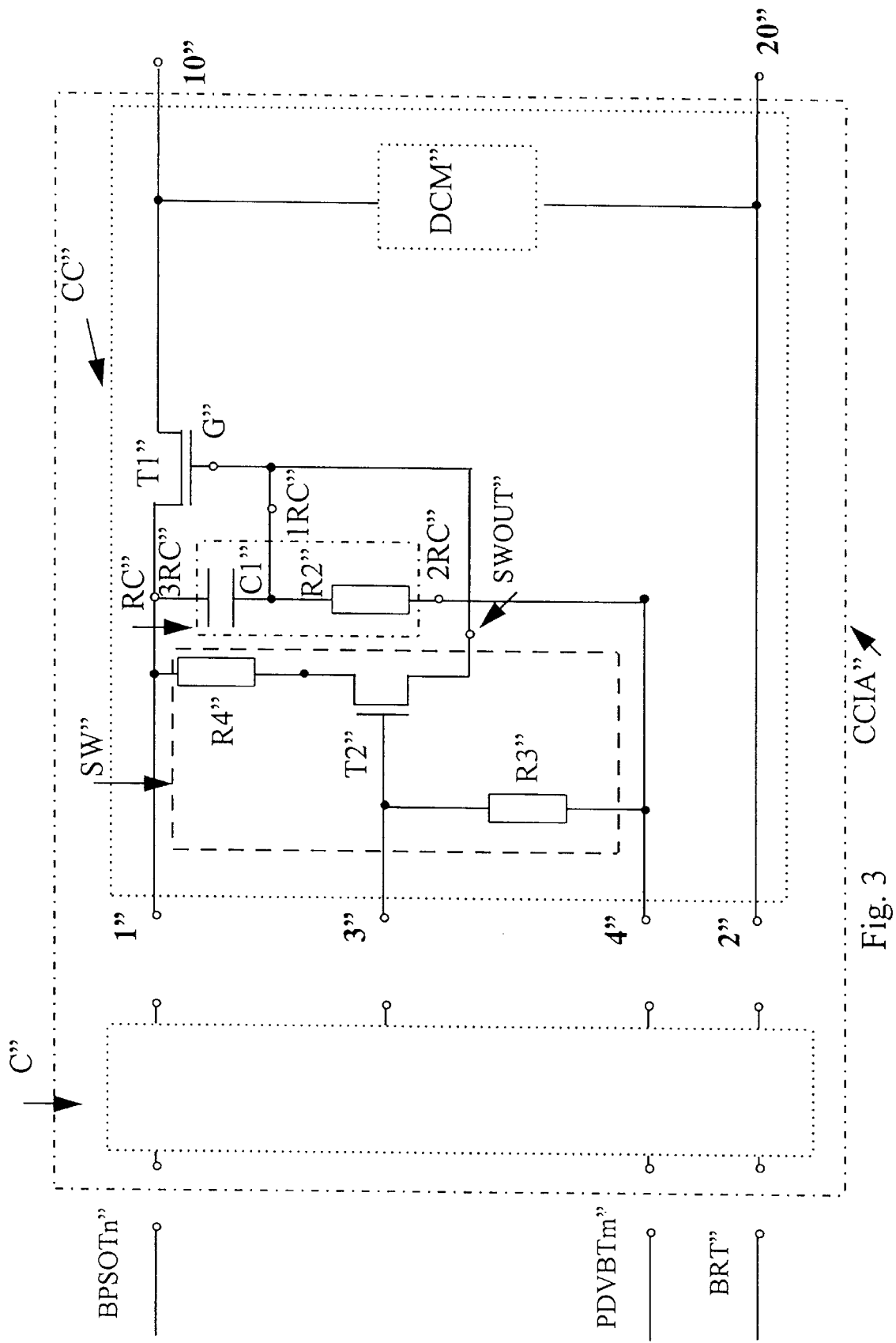
FIG. 3 shows a third embodiment of such a current control interface arrangement, denoted with CCIA", according to the invention.

FIGS. 2 and 3 respectively depict a second and a third embodiment of a current control interface arrangement according to the invention, denoted by CCIA' and CCIA" respectively. These embodiments can be used in case an auxiliary voltage is available on the backplane. This auxiliary voltage can for instance be 48 V in case of a 0 V reference voltage and a 5 V power supply voltage, or may be −24 V, in case of the some 0 V reference voltage and 5 V power supply voltage. Such an auxiliary voltage can be used to lower the on-resistance of the active device T1, resulting in less power dissipation in this device, or can allow the use of positive-on pass gates, even in the case of a positive power supply voltage with respect to the reference. Since a positive-on pass gate, at the time of the invention, is cheaper than a negative-on pass gate, such an implementation will result in a cheaper card circuit.

In the following paragraph, a description of the embodiments of FIGS. 2 and 3 will be made, for power supply voltage values positive with respect to the reference potential, and for an auxiliary voltage value that is negative with respect to the reference potential. Also in this case a negative-on pass-gate and switching means have to be used, as will become clear from the remainder of this document. In case the power supply voltage is negative with respect to the reference potential, with the auxiliary voltage being positive with respect to the reference potential, a positive-on pass gate and switching means have to be used. Since the functional description, including implementation details, apart from the pass-gate type, are identical for these two cases, only the first case will be described. After this description, embodiments to be used in case the power supply and the auxiliary voltage are either both positive or either both negative with respect to the reference potential, will be described.

With respect to the current control interface arrangement CCIA that was depicted in FIG. 1, card circuits CC', respectively CC", included in the second, respectively third, embodiment of the current control interface arrangement CCIA', respectively CCIA", include a fourth input terminal 4', respectively 4", which is to be coupled via connector means C', respectively C", with an auxiliary voltage board terminal PDVBTm', respectively PDVBTm". The auxiliary voltage provided at this auxiliary voltage board terminal PDVBTm', respectively PDVBTm", is thus negative with respect to the reference voltage, present at board reference terminal BRT', respectively BRT", at the respective backplanes. The connector means C', respectively C", is further adapted to couple fourth input terminal 4' respectively 4", together with the first input terminal 1' respectively 1", of card circuit CC' respectively CC", simultaneously to their respective counterterminals on the backplane, being PDVBTm' and PDVBTm" respectively for terminals 4' and 4", and BPSOTn' and BPSOTn" for input terminal 1' and 1", wherein BPSOTn'and BPSOTn" represent the respective board power supply output terminals, on the backplane module, delivering a positive supply voltage with respect to the reference potential at the respective board reference terminals BRT' and BRT". The further sequence of coupling has not changed with respect to the previous embodiment of the current control interface arrangement CCIA, thus during insertion of the card in the backplane, first respective second terminals 2' and 2", of respective card circuits CC' and CC", are coupled to the respective board reference terminals BRT' and BRT", followed by the simultaneous coupling of respective first input terminals 1' and 1", and respective fourth input terminal 4' and 4", to corresponding terminals BPSOTn', respectively BPSOTn" and PDVBTm', respectively PDVBTm", at the backplane. Finally the enable input terminals 3', respectively 3" are coupled to the respective board power supply output terminals BPSOTn' and BPSOTn".

The card circuits CC', respectively CC", basically include the some elements as the previously described embodiment of the card circuit CC. Power supply output terminals 10', resp. 10" are coupled to load power supply terminals (not shown on FIG. 2 and FIG. 3) and reference output terminals 20', resp. 20" are coupled to load reference terminals (not shown on FIG. 2 and FIG. 3).

The second, resp. third embodiments of the card circuit, CC' respectively CC", also have an optional third output terminal, denoted DT' on FIG. 2, (on FIG. 3 the third output terminal is not shown), which will be further described in a later paragraph.

The second, resp. third embodiments of the card circuit CC' and CC", include a negative-on pass-gate T1', resp. T1", with a conductive path being coupled between respective first input terminals 1' and 1", and respective power supply output terminals 10' and 10" of the respective card circuits CC' and CC". The control electrode, denoted G', resp. G", of the negative-on pass-gate T1', resp. T1", is coupled to first time constant means terminal 1RC', resp. 1RC" of respective time constant means RC' and RC", and to output terminal SWOUT', resp. SWOUT", of respective enable controlled switches SW' and SW". These enable controlled switches SW', respectively SW", have the same function as the enable controlled switch SW of the previous embodiment of the card circuit, CC, and will therefore not be further described. The second embodiment of the enable controlled switch SW', including the negative-on switching means T2', for instance a pMOS transistor, input resistor R3' and source degeneration resistor R4', of FIG. 2 is furthermore completely identical to the embodiment of the enable controlled switch SW of FIG. 1. The third embodiment of the enable controlled switch SW" shown FIG. 3, including switching means T2", input resistor R3" and source degeneration resistor R4", is different with respect to both other embodiments, in this sense that input resistor R3", of the third embodiment SW" is coupled between the control electrode of switching means T2" and the fourth input terminal 4", in contrast to the first and second embodiments where input resistors R3, resp R3', are coupled between the control electrode of the switching means T2, resp. T2' and the second input terminal 2, resp 2', of the card circuits CC, resp CC'. However, the functioning of all three different embodiments SW, SW', and SW" of the enable controlled switches is identical to the already described functioning of the first embodiment SW. This difference in coupling between the third and the other two embodiments will have an influence on the time with which transistor T2 will be switched on during the extraction event, on its inherent resistance, and thus also on the time with which the negative-on pass-gate T1 will be turned off. However, this inherent resistance of transistor T2 is negligible with respect to R4, this influence thus being marginal.

The time constant means RC', resp RC" also include first time constant means terminals 1RC', resp. 1RC", second time constant means terminals 2RC', resp. 2RC" and third time constant means terminals 3RC', resp. 3RC", resistors R2', resp. R2", coupled between first time constant means terminals 1RC', resp. 1RC" and respective second time constant means terminals 2RC', resp. 2RC", and capacitors C1', resp. C1" coupled between first time constant means terminals 1RC', resp. 1RC" and third time constant means terminals 3RC', resp. 3RC". The third time constant means terminals 3RC', resp. 3RC" are coupled to first input terminals 1', resp 1", of respective card circuits CC', resp. CC". Second time constant means terminals 2RC', resp 2RC" of time constant means RC' resp RC", are coupled to fourth input terminals 4', resp 4", of card circuits C' resp. C". In fact, this is the only difference of the second and third embodiments of the time constant means with respect to the first embodiment, in which the second time constant means terminal 2RC is coupled to the second input terminal 2 of the card circuit C.

The coupling of the second time constant means terminals 2RC', resp 2RC", of the second and third embodiments, to the fourth input terminals 4', resp 4", of card circuits CC', resp CC", has the benefit that the control voltages of the negative on pass-gates T1', resp T1", in these embodiments, can be pulled down beneath the reference voltage. For a pMOS transistor embodiment of the negative-on pass-gate, this results in a lower on-resistance of this transistor, in its turn resulting in a smaller voltage drop over this transistor, and therefore less power dissipation in this transistor, since the current through this transistor is mainly determined by the load.

Another benefit is that these embodiments, if included in a power sequencing apparatus, as will be further described, will allow these power sequencing apparatus to also couple power supplies supplying voltages lower than the reference voltage. This is not possible with the first embodiment of the current control interface apparatus CCIA, as will become clear during the description of the power supply sequencing apparatus in a later paragraph.

Both second and third embodiments of the card circuit CC', resp CC", further include decoupling capacitive means DCM', resp DCM", coupled between respective power supply output terminals 10' and 10" and respective reference output terminals 20' and 20". These decoupling capacitive means DCM' and DCM" and further identical to the decoupling capacitive means DCM previously described. Therefore the function and possible embodiments of these decoupling capacitive means DCM', DCM" will not be further mentioned.

The operation of both second and third embodiments of the current control interface arrangements is the same as the operation of the first embodiment of the current control interface arrangement CCIA, and will therefore not be further repeated. As already mentioned, the coupling of the enable controlled switch either towards the fourth input terminal, in the second embodiment, as well as the coupling of the second time constant means terminals 2RC' and 2RC" to the fourth input terminal 4', resp 4", have a small influence on the timings and delays with which the negative-on pass-gate T1', resp. T1", is switched on and off. This can however easily be compensated by slightly adapting the resistance value of the resistors R2', resp R2" of the time constant means.

In case both the power supply voltage delivered by the board power supply output terminal and the auxiliary voltage delivered by the auxiliary board voltage output terminal are positive with respect to the reference potential on the board reference terminal, and in case this auxiliary voltage is more positive with respect to the power supply voltage, an embodiment of the card circuit using positive-on pass-gates can be used. Compared to the embodiment with negative-on pass-gates this solution is cheaper, for reasons that where already mentioned in a previous paragraph. The auxiliary voltage has to exceed the power supply voltage with an amount that is larger or equal than the threshold voltage of the positive-on pass gate. In this embodiment, which is similar to the one shown in FIG. 3, but where the transistors are now n-type transistors, the voltage for turning-on the positive-on pass gate will then be the auxiliary voltage, again provided to the positive-on pass gate by a time constant means circuit. The enable controlled switch, including now a nMOS type transistor in this embodiment, is open in case the enable input terminal is coupled to the board power supply output terminal during hot insertion, and during extraction, the enable controlled switch closes, pulling down the control voltage at the positive-on pass gate.

In case both power supply voltage delivered by the board power supply output terminal and the auxiliary voltage delivered by the auxiliary voltage board terminal are negative with respect to the reference potential on the board reference terminal, and in case the auxiliary voltage is more negative with respect to the power supply voltage, and embodiment of the card circuit using negative-on pass gates is to be used. Compared to the solution without the auxiliary voltage however, this embodiment is more expensive since the embodiment without auxiliary voltage uses a positive-on pass gate. The only reason why one should prefer an embodiment using the auxiliary, more negative, voltage is when the current control interface arrangement is to be included in a power supply sequencing apparatus which will be described in a further paragraph.

Figure 4:
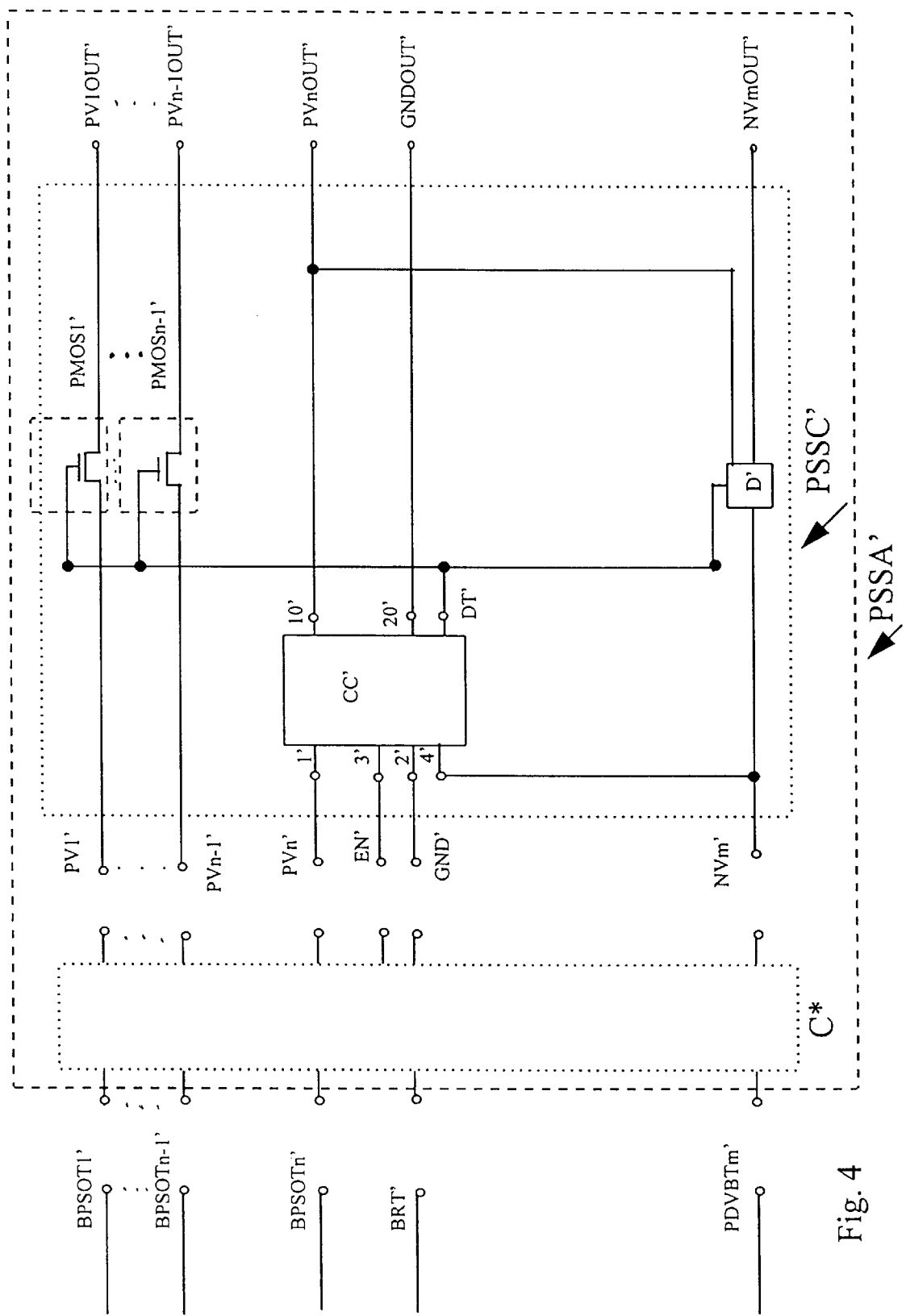
FIG. 4 shows an embodiment of a power supply sequencing apparatus including the variant embodiment CCIA' of the current control interface arrangement of FIG. 2.

All three depicted embodiments CCIA, CCIA' and CCIA", wherein a negative-on pass gate is used for the active device, and wherein the switching means is a negative-on switching means, of the current control arrangement can be included in a power supply sequencing apparatus. Referring to FIG. 4, one embodiment of such a power supply sequencing apparatus, denoted with PSSA', is shown, including a power supply sequencing circuit PSSC', which includes the second embodiment of the card circuit CC', shown in FIG. 2, and a connector means C*, including the second embodiment of the connector means C' (not shown on FIG. 4). For these embodiments of the power supply sequencing apparatus that include the second or third embodiment of the card circuit, the auxiliary voltage has to be lower than the voltage delivered by the board power supply output terminal.

Referring to FIG. 4, the power supply sequencing circuit PSSC' includes n+3 input terminals, of which a first plurality of n distinct supply voltage input terminals, PV1', . . . ,PVn−1, Pvn' are respectively to be coupled to a fourth plurality of n supply voltage board output terminals, denoted BPSOT1', . . . , BPSOTn−1', BPSOTn' respectively on FIG. 4. Remark that the board power supply output terminal BPSOT', of FIG. 2, is part of said fourth plurality of n positive supply voltage board output terminals. This board power supply output terminal BPSOTn' is to be coupled to input terminal PVn' of the power supply sequencing circuit PSSC', which, in its turn, is coupled to the first input terminal 1' of the card circuit CC'. Remark also that the board power supply output terminal BPSOTn' is delivering the supply voltage having the most positive value with respect to the reference potential delivered by the board reference terminal BRT'. The values of the n−1 remaining voltages received by the n−1 remaining distinct supply voltage input terminals PV1' to PVn−1' are more positive than the voltage delivered by the auxiliary voltage board terminal PDVBTn' but more negative than the voltage delivered by the board power supply output terminal BPSOTn'.

The power supply sequencing circuit PSSC' further has a reference input terminal, GND', coupled to the second input terminal 2' of the card circuit CC', and to be coupled, via the connector means C*, to the board reference terminal BRT'. An enable input terminal, denoted with EN', of the power supply sequencing circuit PSSC', is coupled to the enable input terminal 3' of the card circuit CC', and is to be coupled to the board power supply output terminal BPSOTn' via the connector means C*.

The power supply output terminal 10' of the card circuit C' is coupled to a further output terminal, denoted PVnOUT', of the power supply sequencing circuit PSSC'. The reference output terminal 20' of the card circuit C' is coupled to a reference voltage output terminal, denoted GNDOUT', of the power supply sequencing circuit PSSC'. n−1 input terminals, PV1', . . . ,PVn−1', included within the first plurality of positive supply voltage input terminals, and not receiving the most positive supply voltage, are coupled via a second plurality of n−1 similar pass-gates, denoted by PMOS1', . . . ,PMOSn−1', to a third plurality of n−1 distinct supply voltage output terminals, denoted PV1OUT', . . . ,PVn−1OUT respectively, of the power supply sequencing circuit PSSC'. Each of these n−1 similar pass gates comprised within said second plurality, PMOS1', . . . PMOSn−1', is similar to the negative on pass-gate T1', included in the card circuit CC', and has a control terminal coupled to the third output terminal DT' of this card circuit CC', a first conductive terminal coupled to a respective distinct terminal of one of these n−1 input terminals PV1', . . . ,PVn−1', and a second conductive terminal coupled to a respective distinct terminal included in the third plurality of n−1 distinct positive supply voltage output terminals PV1OUT', . . . ,PVn−1OUT'.

The power supply sequencing circuit PSSC' of FIG. 4 further includes a auxiliary supply input terminal, denoted Nvm', which is coupled to the auxiliary voltage board output terminal PDVBTm' delivering the auxiliary voltage being the lowest voltage supplied to the apparatus. This auxiliary supply input terminal Nvm' of the power supply sequencing circuit PSSC' is also coupled to the fourth input terminal 4' of the card circuit CC', which thus receives the most negative supply voltage.

This auxiliary supply voltage input terminal Nvm' is coupled via an additional switch circuit, denoted D', to a further negative output terminal NVmOUT'. This additional switch circuit D' will be further described in a further paragraph.

The connector means C* of the power supply sequencing apparatus PSSA', includes the connector C' of the current control interface arrangement of FIG. 2, (not shown on FIG. 4), and is further adapted to couple the remaining n−1 distinct supply voltage input terminals PV1' to PVn−1' to the supply voltage board output terminals BPSOT1' to BPSOTn−1', simultaneously with the coupling of the input terminals Pvn' and NVm' to the respective terminals BPSOTn' and PDVBTm' at the backplane. In one embodiment of the connector means C*, this is again realised by the fact that all pins for coupling PV1', ... ,PVn' and NVm' have identical lengths, shorter than the length of the pin for coupling the GND' terminal, but longer than the length of the pin for coupling the EN' terminal.

Although they are not shown in FIG. 4, all supply voltage output terminals, the further output terminal and the auxiliary output terminal of the power supply sequencing circuit, are decoupled via decoupling capacitive means towards the reference potential at the GNDOUT' terminal. Embodiments of these decoupling capacitive means are identical to these already mentioned for the decoupling capacitive means DCM of FIG. 1, and will therefore not be further described.

Remark that the connector means C*, as was the case for the other connector means embodiments, generally has one part being physically located at the backplane and one part being physically located at the card.

The power supply sequencing circuit PSSC', on the other hand, generally makes part of the same card as the one including the card circuit C' and the load (not shown).

The operation of the power supply sequencing apparatus PSSA' of FIG. 4 will now be described. During insertion of the card into the backplane first the GND' input terminal of the power supply sequencing circuit PSSC' is coupled to the board reference terminal BRT', by the special construction of the connector means C*. Next all distinct supply voltage board output terminals BPSOT1' to BPSOTn', as well as the auxiliary voltage board terminal PDVBTm' are coupled simultaneously to their corresponding distinct supply voltage input terminals PV1' to Pvn' and the auxiliary supply input terminal NVm' respectively , on the power supply sequencing circuit PSSC'. At this moment, by the operation of the card circuit C', the voltage at the third output terminal DT' of the card circuit, which is coupled to the control electrode of the negative on pass-gate T1' as well as to the control electrodes of all similar pass gates, is approximately at the most positive supply voltage level, leaving T1', as well as all other negative-on pass gates which are similar to T1', off.

Figure 5:
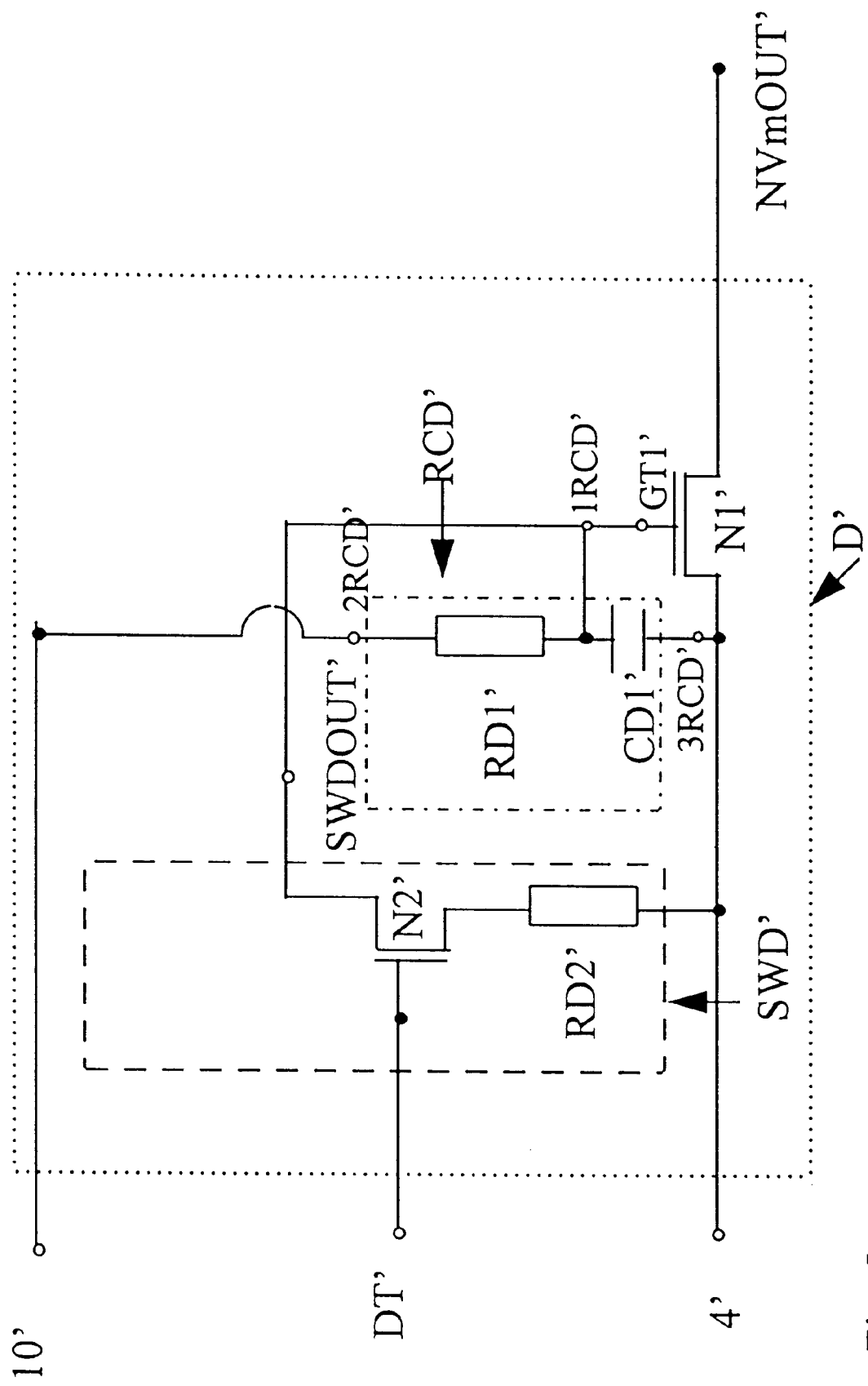
FIG. 5 shows an embodiment of an additional switch circuit D', included in the power supply sequencing apparatus of FIG. 4.

Next the enable input terminal EN' of the power supply sequencing circuit PSSC' is coupled to the board power supply output terminal BPSOTn' via the connector means. By the operation of the card circuit CC', the third output terminal DT' will now be pulled down towards the auxiliary voltage which is the most negative input voltage delivered to the card circuit C'. Since the third output terminal DT' of the card circuit CC' serves as the control electrode of all similar pass gates T1', pMOS1', ... , pMOSn−1', of which one conductive terminal is coupled to one of the respective distinct supply voltage input terminals PVn',PV1', ... ,PVn−1', the second conductive terminal will be raised to the respective value of the corresponding supply voltage at the first mentioned conductive terminals, in a sequence which is now purely determined by the value of the potential at this first mentioned conductive terminal. Indeed, for a pMOS-type embodiment of the negative on pass gate T1' and all other similar pass gates, the pass-transistor of which the source is coupled to the highest voltage will first deliver this source voltage to its drain, followed by the transistor having its source at the highest but one positive voltage and so on, until the transistor coupled to the most negative voltage of the first plurality of distinct supply voltages (which exceeds the auxiliary voltage) will finally deliver this voltage at its drain. It has to be remarked that the latter supply voltage has to exceed the auxiliary voltage with an amount larger or equal than the threshold value of these similar pMOS pass-gates. Only the auxiliary supply voltage cannot be passed through this way, since in the case the gate voltage of the pMOS pass gate would be identical to its source voltage, inhibiting the turning on this pMOS pass gate. Therefore a separate additional switch circuit is used, depicted in FIG. 4 as D'. A more detailed scheme of an embodiment of such an additional switch circuit is shown in FIG. 5.

The mentioned pass gates have to be similar to T1' within certain tolerances. Although in one embodiment the power supply sequencing apparatus may contain identical negative on pass-gates, other embodiments exist wherein the pass-gates, although they all have to be of the negative-on type, thus conducting when the control voltage is lower than the voltage appearing at one of the conductive terminals, may differ from each other within certain tolerances. For proper functioning of the circuit, it is however required that a certain predetermined percentage of the most positive voltage, for instance 90%, appears at the respective output terminal, before the some, predetermined percentage of the highest but one positive voltage, appears at the corresponding output terminal, and so on. The time intervals required between reaching the predetermined percentages of the supply voltages at their respective terminals are defined by some user specifications. It is known to a person skilled in the art how to determine, from these user specifications, and from the different values of the supply voltage values to provide on the card, the corresponding margins and tolerances with which the negative on pass-gates can vary with respect to each other. Therefore this will not be further described.

During extraction, the additional switch circuit D', will decouple first the auxiliary output terminal NVmOUT' from the auxiliary supply voltage input terminal Nvm', followed by the decoupling of the supply voltage output terminal amongst the first plurality which is delivering the lowest or most negative voltage amongst the n distinct supply voltages, from its corresponding supply voltage input terminal. This is then followed by the decoupling of the output terminal delivering the lowest but one voltage of the first plurality, and so on, until the further output terminal PVnOUT' is finally decoupled from the first input terminal 1' of the card circuit C', by the negative-on pass gate T1'. This sequence is again realised by the operation of the similar negative on pass-gates, which are all controlled by the some voltage appearing on the third output terminal DT' of the card circuit, and which will consequently open in the mentioned order, just because of their pass gate function.

The rate with which they will open, is determined by the source degeneration resistance R4' and the capacitor C1' of the card circuit C'. Again the same remarks about tolerances and specifications hold as already mentioned for the power-up insertion situation.

By the working of the power supply sequencing apparatus the current in all power supply lines on the card is thus already smoothly reduced to zero, before the connector is really disconnecting the respective supply input terminals of the card from the board.

After having decoupled the auxiliary output terminal, all supply voltage output terminals, and the further output terminal, the power supply sequencing apparatus will finally decouple the reference output terminal form the board reference terminal, as was described for the operation of the card circuit.

The thus obtained sequence for powering up and off several supplies on a card is particularly useful for these circuits that have both 5 V and 3.3 V components on the same card. At the time of the invention, the 5 V components in general have two protection diodes as electrostatic discharge protection devices at their input and output terminals, one protection diode being reverse biased between the input/output terminal and the reference terminal, a second protection diode being reverse biased between the input/output terminal and the terminal to which the 5 V is coupled. The 3.3 V components however use other protection elements. Since some output terminals of the 5 V components are coupled to some input terminals of the 3.3 V components, the diode between the output terminal and the 5 V terminal must be prevented from turning on, for guaranteeing normal functioning of the device. Since the input terminal of the 3.3 V component is coupled via the 3.3 V circuit elements, to the 3.3 V supply line, it is therefore mandatory that the voltage appearing at the 3.3 V supply line is always lower than the voltage appearing at the 5 V supply line. This is guaranteed by the power supply sequencing apparatus of the present invention.

FIG. 5 depicts an embodiment of an additional switch circuit D', to be used for passing through and switching off the auxiliary supply voltage value. This embodiment basically includes the same building blocks as the card circuit, namely a active device being now a positive on pass gate N1', a time constant means, denoted by RCD', and a switch, denoted by SWD', between the power supply input terminal, in this case being the fourth input terminal of the card circuit, 4', and the control electrode of this pass gate N1'. The switch SWD' is controlled by the third output terminal DT' of the card circuit CC'. In the additional switch circuit D' both the pass gate N1' as the switch transistor N2' of the third card circuit output terminal controlled switch SWD' are positive-on transistors, meaning that these transistors can only conduct current if the voltage at their control electrode is positive with respect to the voltage at one of their conductive path terminals. Examples are nMOS field effect or npn bipolar transistors.

The additional time constant means RCD' again includes a resistor, denoted RD1' coupled between the power supply output terminal 10' of the card circuit C', which is also the second additional time constant means terminal 2RCD', and the control electrode GT1' of the positive on pass gate N1' which is also the first additional time constant means terminal 1RCD'. The additional time constant means further includes an additional capacitor, denoted CD1' coupled between the first additional time constant means terminal 1RCD' and the fourth input terminal 4' of the card circuit C', which is also the third additional time constant means terminal 3RCD'.

The positive on pass gate N1' has its control terminal GT1' thus coupled to the first additional time constant means terminal, and has a first conductive path terminal coupled to the fourth input terminal 4' of the card circuit, and a second conductive path terminal coupled to the auxiliary output terminal NVmOUT'.

The third card circuit output terminal controlled switch SWD', of FIG. 5 includes an n-type switching means N2', a gate terminal of which constitutes the control terminal of the third card circuit output controlled switch SWD', a first conductive path terminal being coupled to the fourth input terminal 4' of the card circuit via an additional source degeneration resistor RD2', and a second conductive path terminal being coupled to the control electrode of the positive-on pass gate N1'.

During the initial stages of the insertion event, the reference terminal receives its reference voltage, followed by all supply voltage input terminals and the auxiliary input terminal of the power supply sequencing circuit which receive their appropriate supply voltages and auxiliary voltage respectively. The third output terminal DT' of the card circuit is then still at the most positive voltage. Transistor N2' is thus on, pulling down its drain voltage, which is also the gate voltage of transistor N1' to the auxiliary supply voltage. N1' is thus off. Next the connector means C* couples the enable input terminal EN' to the board power supply output terminal BPSOTn'. The potential at terminal 10' will then slowly rise towards the most positive voltage, whereas at the same time the voltage at terminal DT' is slowly dropping towards the auxiliary supply voltage. Transistor N2' will therefore gradually switch off. Therefore the gate voltage of transistor N1' will rise again, with a time constant now determined by the product of the resistance value of the additional resistor RD1' and the capacitance value of the additional capacitor CD1'. This time constant determines the rate at which N1' will conduct, thus also the rate at which the auxiliary supply voltage as present at terminal 4', will be delivered to the auxiliary output terminal NVmOUT'. By adjusting these resistance and capacitance values, the delay of the additional delay circuit can therefore be controlled to be larger than the delay of the similar pass gates. Typical values for the resistance of RD1' are in the range of 100 KOhm to 200 KOhm, and for the capacitance of CD1' a typical value of 100 nF is used.

During extraction, the voltage at third output terminal DT' of the cardcircuit, is raised to the most positive supply voltage of the first plurality by the working of the card circuit. This will again turn on the n-type switching means N2', which will therefore pull down the voltage at its drain terminal to the potential at the fourth input terminal 4', of the card circuit, being the auxiliary supply voltage which is the most negative supply voltage. This will switch off transistor N1', this switching off occurring faster than the switching off of all similar negative on pass-gates of the power supply sequencing apparatus, by carefully selecting the positive-on pass gate transistor N1' with respect to the selection of the similar negative-on pass gates pMOS1' to pMOSn-1' and pMOSD1' to pMOSDm-1'. A person skilled in the art knows how to appropriately select such pass gates, therefore this will not be further described into detail.

Other embodiments of the power supply sequencing apparatus (not shown) are based on the first and third embodiments of the current control interface arrangement CCIA and CCIA'. It has to be remarked that the first embodiment of the current control interface arrangement CCIA, as depicted in FIG. 1, can only be used in a power supply sequencing apparatus for coupling board power supply output terminals delivering positive supply voltages with respect to the reference voltage as present on the board reference terminal, including the board power supply terminal BPSOTn'. These potentials therefore also imply the use of negative-on pass gate for active device T1, as well as the use of a p-type switching means or negative-on pass gate, as for instance a pMOSFET or a pnp bipolar transistor for transistor T2.

While the principles of the invention have been described above in connection with specific apparatus, it is to be clearly understood that this description is made only by way of example and not as a limitation on the scope of the invention.

I claim:

1. Current control interface arrangement (CCIA) for controlling a current flowing through a load and through a board power supply when coupling and decoupling said load to and from said board power supply respectively, said current control interface arrangement including a card circuit (CC) and a connector means (C), said card circuit (CC) including a first input terminal (1) and a second input terminal (2) to be coupled to a board power supply output terminal (BPSOTn) and a board reference terminal (BRT) respectively of said board power supply, via said connector means (C)

a power supply output terminal (10), and a reference output terminal (20) to be coupled to a load power supply terminal (LPST) and to a load reference terminal (LRT) respectively, of said load, an enable input terminal (3)

an active device (T1) having a control electrode (G) and a conductive controlled path which is coupled between said first input terminal (1) and said power supply output terminal (10), time constant means (RC) having a first time constant means terminal (1RC) coupled to said control electrode (G) of said active device (T1), a second time constant means terminal (2RC) coupled to said second input terminal (2), and a third time constant means terminal (3RC), said time constant means (RC) controlling the rate at which said active device is rendered conductive in accordance with a predetermined time constant, and including a resistor (R2) coupled to a capacitor (C1), characterised in that said enable input terminal (3) is to be coupled to and decoupled from said board power supply output terminal (BPSOTn), via said connector means(C)

said connector means (C) is adapted to first couple said reference input terminal (2) of said card circuit to said board reference terminal (BRT), next couple said first input terminal (1) of said card circuit to said board power supply output terminal (BPSOTn), and finally couple said enable input terminal (3) to said board power supply output terminal (BPSOTn) during said coupling of said load to said board power supply, and that said connector means is further adapted to first decouple said enable terminal (3) from said board power supply output terminal (BPSOTn), next decouple said first input terminal (1) from said board power supply output terminal (BPSOTn), and finally decouple said second input terminal (2) from said board reference terminal (BRT) during said decoupling of said load from said board, said third time constant means terminal (3RC) is coupled to said first input terminal (1) of said card circuit, said capacitor (C1) of said time constant means is coupled between said third time constant means terminal (3RC) and said first time constant means terminal (1RC), said resistor (R2) of said time constant means is coupled between said second time constant means terminal (2RC) and said first time constant means terminal (1RC), said card circuit (CC) further includes an enable controlled switch (SW) coupled between said enable input terminal (3) being a control terminal of said enable controlled switch, said first input terminal (1) of said card circuit being a fixed terminal of said enable controlled switch, and said first time constant means terminal (1RC), being an output terminal (SWOUT) of said enable controlled switch, said enable controlled switch being closed if said enable input terminal (3) is decoupled from said board power supply output terminal (BPSOTn), said enable controlled switch being open, if said enable input terminal (3) is coupled to said board power supply output terminal (BPSOTn).

2. Current control interface arrangement according to claim 1, characterised in that said enable controlled switch (SW;SW') includes a switching means (T2;T2') a control terminal of said switching means (T2; T2') constituting said control terminal of said enable controlled switch, a variable terminal of said switching means (T2; T2') constituting said output terminal (SWOUT; SWOUT') of said enable controlled switch, a fixed terminal of said switching means (T2; T2') being coupled to said first input terminal (1; 1'), said enable controlled switch (SW; SW') further including an input resistor (R3; R3') coupled between said enable input terminal (3;3') and said second input terminal (2;2') of said card circuit.

3. Current control interface arrangement according to claim 2, characterised in that said enable controlled switch (SW';SW") further includes a source degeneration resistance (R4';R4") coupled between said fixed terminal of said switching means (T2;T2") and said first input terminal of said card circuit (1';1").

4. Power supply sequencing apparatus including at least one current control interface arrangement (CCIA) according to claim 3, characterised in that said active device (T1) is a negative-on pass gate and that said switching means (T2) is a negative-on switching means, in that said board power supply output terminal (BPSOTn) is delivering a voltage that is more positive with respect to the voltage delivered by said board reference terminal (BRT), in that said card circuit (CC) further includes a third output terminal (DT) coupled to said control electrode (G) of said active device, in that said card circuit (CC) forms part of a power supply sequencing circuit, said power supply sequencing circuit receiving a first plurality of n distinct positive supply voltages with respect to said voltage delivered by said board reference terminal, at a corresponding first plurality of n distinct positive supply voltage input terminals, said power supply sequencing circuit further receiving a reference voltage at a reference input terminal coupled to said second input terminal of said card circuit, and an enable voltage at an enable terminal of said power supply sequencing circuit, being coupled to said enable input terminal (3) of said card circuit (CC), one terminal comprised within said first plurality receiving the most positive input voltage, being coupled to said first input terminal (1) of said card circuit (CC), said power supply sequencing circuit further including a second plurality of n−1 similar negative-on pass gates, each of said similar negative-on pass-gates comprised in said second plurality being similar to said negative-on pass-gate (T1)

and having a control terminal coupled to said third output terminal (DT) of said card circuit (CC), a second terminal coupled to a distinct terminal comprised in said first plurality, except for said one terminal of said first plurality receiving said most positive supply voltage, and a third terminal constituting an output terminal included in a third plurality of n−1 distinct positive supply voltage output terminals of said power supply sequencing circuit, said reference output terminal (20) of said card circuit (CC) being coupled to a reference voltage output terminal of said power supply sequencing circuit, said power supply output terminal (10) of said card circuit being coupled to a further output terminal of said power supply sequencing circuit, in that said connector means is further adapted to simultaneously couple, respectively decouple, each of said n distinct positive supply voltage input terminals of said power supply sequencing circuit comprised within said first plurality, to, respectively from, a corresponding fourth plurality of n distinct positive supply voltage board output terminals, said board power supply output terminal being included in said fourth plurality, and being adapted to deliver said most positive supply voltage to said power supply sequencing apparatus via said connector means.

5. Power supply sequencing apparatus (PSSA') including at least one current control interface arrangement (CCIA';CCIA") according to claim 3, characterised in that said active device (T1';T1") is a negative-on pass gate and said switching means (T2';T2") is a negative-on switching means, in that said auxiliary voltage board terminal (PDVBTm'; PDVBTm") is delivering a voltage that is more negative with respect to the voltage delivered by said board power supply output terminal (BPSOT';BPSOT"), in that said card circuit (CC';CC") further includes a third output terminal (DT') coupled to said control electrode (G';G") of said negative on pass-gate, in that said card circuit (CC';CC") forms part of a power supply sequencing circuit (PSSC'), said power supply sequencing circuit (PSSC') receiving a first plurality of n distinct supply voltages, including one supply voltage at the value delivered by said board power supply output terminal (BPSOT';BPSOT") and including n−1 distinct supply voltages with values lower than the voltage delivered by said board power supply output terminal (BPSOTn';BPSOTn") and higher than the voltage delivered by said auxiliary voltage board terminal (PDVBTm';PDVBTm") at a corresponding first plurality of n distinct supply voltage input terminals (PV1', . . . PVn'), said power supply sequencing circuit (PSSC') further receiving a reference voltage at a reference input terminal (GND') coupled to said second input terminal (2';2") of said card circuit (CC';CC"), and an enable voltage at an enable terminal (EN') of said power supply sequencing circuit (PSSC'), being coupled to said enable input terminal (3';3") of said card circuit (CC';CC"), one terminal (PVn') comprised within said first plurality receiving the said voltage delivered by said board power supply output terminal (BPSOT';BPSOT") being coupled to said first input terminal (1';1") of said card circuit (CC';CC"), said power supply sequencing circuit (PSSC') further including a second plurality of n−1 similar negative-on pass-gates (PMOS1', . . . ,PMOSn−1'), each of said similar negative-on pass-gates comprised in said second plurality (PMOS1', . . . ,PMOSn−1') being similar to said negative-on pass-gate (T1';T1") and having a control terminal coupled to said third output terminal (DT') of said card circuit (CC';CC"), a second terminal coupled to a distinct terminal comprised in said first plurality, except for said one terminal (PVn') of said first plurality receiving said most positive supply voltage, and a third terminal constituting an output terminal included in a third plurality of n−1 distinct supply voltage output terminals (PV1OUT', . . . ,PVn−1OUT') of said power supply sequencing circuit (PSSC'), said reference output terminal (20';20") of said card circuit (CC';CC") being coupled to a reference voltage output terminal (GNDOUT') of said power supply sequencing circuit (PSSC'), said power supply output terminal (10';10") of said card circuit being coupled to a further out terminal PVnOUT') of said power supply sequencing circuit (PSSC'), in that said connector means is further adapted to simultaneously couple, respectively decouple, each of said n distinct supply voltage input terminals of said power supply sequencing circuit (PSSC') comprised within said first plurality (PV1', . . . ,PVn'), to, respectively from, a corresponding fourth plurality of n distinct supply voltage board output terminals, said board power supply output terminal (BPSOTn') being included in said fourth plurality and being adapted to deliver its power supply voltage to said one terminal of said first plurality, via said connector means.

6. Power supply sequencing apparatus including at least one current control interface arrangement (CCIA) according to claim 2, characterised in that said active device (T1) is a negative-on pass gate and that said switching means (T2) is a negative-on switching means, in that said board power supply output terminal (BPSOTn) is delivering a voltage that is more positive with respect to the voltage delivered by said board reference terminal (BRT), in that said card circuit (CC) further includes a third output terminal (DT) coupled to said control electrode (G) of said active device, in that said card circuit (CC) forms part of a power supply sequencing circuit, said power supply sequencing circuit receiving a first plurality of n distinct positive supply voltages with respect to said voltage delivered by said board reference terminal, at a corresponding first plurality of n distinct positive supply voltage input terminals, said power supply sequencing circuit further receiving a reference voltage at a reference input terminal coupled to said second input terminal of said card circuit, and an enable voltage at an enable terminal of said power supply sequencing circuit, being coupled to said enable input terminal (3) of said card circuit (CC), one terminal comprised within said first plurality receiving the most positive input voltage, being coupled to said first input terminal (1) of said card circuit (CC), said power supply sequencing circuit further including a second plurality of n−1 similar negative-on pass gates, each of said similar negative-on pass-gates comprised in said second plurality being similar to said negative-on pass-gate (T1) and having a control terminal coupled to said third output terminal (DT) of said card circuit (CC), a second terminal coupled to a distinct terminal comprised in said first plurality, except for said one terminal of said first plurality receiving said most positive supply voltage, and a third terminal constituting an output terminal included in a third plurality of n−1 distinct positive supply voltage output terminals of said power supply sequencing circuit, said reference output terminal (20) of said card circuit (CC) being coupled to a reference voltage output terminal of said power supply sequencing circuit, said power supply output terminal (10) of said card circuit being coupled to a further output terminal of said power supply sequencing circuit, in that said connector means is further adapted to simultaneously couple, respectively decouple, each of said n distinct positive supply voltage input terminals of said power supply sequencing circuit comprised within said first plurality, to, respectively from, a corresponding fourth plurality of n distinct positive supply voltage board output terminals, said board power supply output terminal being included in said fourth plurality, and being adapted to deliver said most positive supply voltage to said power supply sequencing apparatus via said connector means.

7. Power supply sequencing apparatus (PSSA') including at least one current control interface arrangement (CCIA';CCIA") according to claim 2, characterised in that said active device (T1';T1") is a negative-on pass gate and said switching means (T2';T2") is a negative-on switching means, in that said auxiliary voltage board terminal (PDVBTm'; PDVBTm") is delivering a voltage that is more negative with respect to the voltage delivered by said board power supply output terminal (BPSOT';BPSOT"), in that said card circuit (CC';CC") further includes a third output terminal (DT) coupled to said control electrode (G';G") of said negative on pass-gate, in that said card circuit (CC';CC") forms part of a power supply sequencing circuit (PSSC'), said power supply sequencing circuit (PSSC') receiving a first plurality of n distinct supply voltages, including one supply voltage at the value delivered by said board power supply output terminal (BPSOT';BPSOT") and including n−1 distinct supply voltages with values lower than the voltage delivered by said board power supply output terminal (BPSOTn';BPSOTn") and higher than the voltage delivered by said auxiliary voltage board terminal (PDVBTm';PDVBTm") at a corresponding first plurality of n distinct supply voltage input terminals (PV1', . . . PVn'), said power supply sequencing circuit (PSSC') further receiving a reference voltage at a reference input terminal (GND') coupled to said second input terminal (2';2") of said card circuit (CC';CC"), and an enable voltage at an enable terminal (EN') of said power supply sequencing circuit (PSSC'), being coupled to said enable input terminal (3';3") of said card circuit (CC';CC"), one terminal (PVn') comprised within said first plurality receiving the said voltage delivered by said board power supply output terminal (BPSOT';BPSOT") being coupled to said first input terminal (1';1") of said card circuit (CC';CC"), said power supply sequencing circuit (PSSC') further including a second plurality of n−1 similar negative-on pass-gates (PMOS1', . . . ,PMOSn−1'), each of said similar negative-on pass-gates comprised in said second plurality (PMOS1', . . . ,PMOSn−1') being similar to said negative-on pass-gate (T1';T1") and having a control terminal coupled to said third output terminal (DT') of said card circuit (CC';CC"), a second terminal coupled to a distinct terminal comprised in said first plurality, except for said one terminal (PVn') of said first plurality receiving said most positive supply voltage, and a third terminal constituting an output terminal included in a third plurality of n−1 distinct supply voltage output terminals (PV1OUT', . . . ,PVn−1OUT') of said power supply sequencing circuit (PSSC'), said reference output terminal (20';20") of said card circuit (CC';CC") being coupled to a reference voltage output terminal (GNDOUT') of said power supply sequencing circuit (PSSC'), said power supply output terminal (10';10") of said card circuit being coupled to a further out terminal PVnOUT') of said power supply sequencing circuit (PSSC'), in that said connector means is further adapted to simultaneously couple, respectively decouple, each of said n distinct supply voltage input terminals of said power supply sequencing circuit (PSSC') comprised within said first plurality (PV1', . . . ,PVn'), to, respectively from, a corresponding fourth plurality of n distinct supply voltage board output terminals, said board power supply output terminal (BPSOTn') being included in said fourth plurality and being adapted to deliver its power supply voltage to said one terminal of said first plurality, via said connector means.

8. Power supply sequencing apparatus including at least one current control interface arrangement (CCIA) according to claim 1, characterised in that said active device (T1) is a negative-on pass gate and that said switching means (T2) is a negative-on switching means, in that said board power supply output terminal (BPSOTn) is delivering a voltage that is more positive with respect to the voltage delivered by said board reference terminal (BRT), in that said card circuit (CC) further includes a third output terminal (DT) coupled to said control electrode (G) of said active device, in that said card circuit (CC) forms part of a power supply sequencing circuit, said power supply sequencing circuit receiving a first plurality of n distinct positive supply voltages with respect to said voltage delivered by said board reference terminal, at a corresponding first plurality of n distinct positive supply voltage input terminals, said power supply sequencing circuit further receiving a reference voltage at a reference input terminal coupled to said second input terminal of said card circuit, and an enable voltage at an enable terminal of said power supply sequencing circuit, being coupled to said enable input terminal (3) of said card circuit (CC), one terminal comprised within said first plurality receiving the most positive input voltage, being coupled to said first input terminal (1) of said card circuit (CC), said power supply sequencing circuit further including a second plurality of n−1 similar negative-on pass gates, each of said similar negative-on pass-gates comprised in said second plurality being similar to said negative-on pass-gate (T1) and having a control terminal coupled to said third output terminal (DT) of said card circuit (CC), a second terminal coupled to a distinct terminal comprised in said first plurality, except for said one terminal of said first plurality receiving said most positive supply voltage, and a third terminal constituting an output terminal included in a third plurality of n−1 distinct positive supply voltage output terminals of said power supply sequencing circuit, said reference output terminal (20) of said card circuit (CC) being coupled to a reference voltage output terminal of said power supply sequencing circuit, said power supply output terminal (10) of said card circuit being coupled to a further output terminal of said power supply sequencing circuit, in that said connector means is further adapted to simultaneously couple, respectively decouple, each of said n distinct positive supply voltage input terminals of said power supply sequencing circuit comprised within said first plurality, to, respectively from, a corresponding fourth plurality of n distinct positive supply voltage board output terminals, said board power supply output terminal being included in said fourth plurality, and being adapted to deliver said most positive supply voltage to said power supply sequencing apparatus via said connector means.

9. Current control interface arrangement (CCIA';CCIA") for controlling a current flowing through a load and through a board power supply when coupling and de-coupling said load to and from said board power supply respectively, said current control interface arrangement including a card circuit (CC';CC") and a connector means (C';C"), said card circuit (CC';CC") including a first input terminal (1';1") and a second input terminal (2';2") to be coupled to a board power supply output terminal (BPSOTn';BPSOTn") and a board reference terminal (BRT';BRT") respectively of said board power supply, via said connector means (C';C"), a power supply output terminal (10';10") and a reference output terminal (20';20") to be coupled to a load power supply terminal (LPST';LPST") and to a load reference terminal (LRT';LRT") respectively, of said load, an enable input terminal (3';3")

an active device (T1';T1") having a control electrode (G';G") and a conductive controlled path which is coupled between said first input terminal (1';1") and said power supply output terminal (10';10"), time constant means (RC';RC") having a first time constant means terminal (1RC';1RC") coupled to said control electrode (G';G") of said active device (T1';T1"), a second time constant means terminal (2RC';2RC"), and a third time constant means terminal (3RC';3RC"), said time constant means (RC';RC") controlling the rate at which said active device is rendered conductive in accordance with a predetermined time constant, and including a resistor (R2';R2") coupled to a capacitor (C1';C1"), characterised in that said card circuit includes a fourth input terminal (4';4") to be coupled via said connector means (C';C") to an auxiliary voltage board terminal (PDVBTm';PDVBTm")

said enable input terminal (3';3") is to be coupled to and decoupled from said board power supply output terminal (BPSOTn';BPSOTn"), via said connector means (C';C")

said connector means (C';C") is adapted to first couple said reference input terminal (2';2") of said card circuit to said board reference terminal (BRT';BRT"), next couple said first input terminal (1';1") of said card circuit to said board power supply output terminal (BPSOTn';BPSOTn") simultaneously with the coupling of said fourth input terminal (4';4") of said card circuit to said auxiliary voltage board terminal (PDVBTm';PDVBTm"), and finally couple said enable input terminal (3';3") to said board power supply output terminal (BPSOTn';BPSOTn") during said coupling of said load to said board power supply, and that said connector means is further adapted to first decouple said enable terminal (3';3") from said board power supply output terminal (PBSOTn';BPSOTn"), next decouple said first input terminal (1';1")from said board power supply output terminal (BPSOTn';BPSOTn") simultaneously with decoupling said fourth input terminal (4';4") from said auxiliary voltage board terminal (PDVBTm';PDVBTm"), and finally decouple said second input terminal (2';2") from said board reference terminal (BRT';BRT") during said de-coupling of said load from said board, said third time constant means terminal (3RC';3RC") is coupled to said first input terminal (1';1") of said card circuit, said second time constant means terminal (2RC';2RC") is coupled to said fourth input terminal (4';4"), said capacitor (C1';C1") of said time constant means is coupled between said third time constant means terminal (3RC';3RC") and said first time constant means terminal (1RC';1RC"), and said resistor (R2';R2") of said time constant means is coupled between said second time constant means terminal (2RC';2RC") and said first time constant means terminal (1RC';1RC"), said card circuit (CC';CC") further includes an enable controlled switch (SW';SW") coupled between said enable input terminal (3';3") being a control terminal of said enable controlled switch, said first input terminal (1';1") of said card circuit being a fixed terminal of said enable controlled switch, and said first time constant means terminal (1RC';1RC"), being an output terminal (SWOUT';SWOUT") of said enable controlled switch, said enable controlled switch being closed if said enable input terminal (3';3") is decoupled from said board power supply output terminal (BPSOTn';BPSOTn"), said enable controlled switch being open, if said enable input terminal (3';3") is coupled to said board power supply output terminal (BPSOTn';BPSOTn").

10. Current control interface arrangement according to claim 9, characterised in that said enable controlled switch (SW") includes a switching means, a control terminal of said switching means (T2") constituting said control terminal of said enable controlled switch, a variable terminal of said switching means (T2") constituting said output terminal (SWOUT") of said enable controlled switch, a fixed terminal of said switching means (T2") being coupled to said first input terminal (1"), said enable controlled switch (SW") further including an input resistor (R3") coupled between said enable input terminal (3") and said fourth input terminal (4") of said card circuit.

11. Current control interface arrangement according to claim 10, characterised in that said enable controlled switch (SW';SW") further includes a source degeneration resistance (R4';R4") coupled between said fixed terminal of said switching means (T2;T2") and said first input terminal of said card circuit (1';1").

12. Power supply sequencing apparatus (PSSA') including at least one current control interface arrangement (CCIA';CCIA") according to claim 10, characterised in that said active device (T1';T1") is a negative-on pass gate and said switching means (T2';T2") is a negative-on switching means, in that said auxiliary voltage board terminal (PDVBTm'; PDVBTm") is delivering a voltage that is more negative with respect to the voltage delivered by said board power supply output terminal (BPSOT';BPSOT"), in that said card circuit (CC';CC") further includes a third output terminal (DT') coupled to said control electrode (G';G") of said negative on pass-gate, in that said card circuit (CC';CC") forms part of a power supply sequencing circuit (PSSC'), said power supply sequencing circuit (PSSC') receiving a first plurality of n distinct supply voltages, including one supply voltage at the value delivered by said board power supply output terminal (BPSOT';BPSOT") and including n−1 distinct supply voltages with values lower than the voltage delivered by said board power supply output terminal (BPSOTn';BPSOTn") and higher than the voltage delivered by said auxiliary voltage board terminal (PDVBTm';PDVBTm") at a corresponding first plurality of n distinct supply voltage input terminals (PV1', . . . PVn'), said power supply sequencing circuit (PSSC') further receiving a reference voltage at a reference input terminal (GND') coupled to said second input terminal (2';2") of said card circuit (CC';CC"), and an enable voltage at an enable terminal (EN') of said power supply sequencing circuit (PSSC'), being coupled to said enable input terminal (3';3") of said card circuit (CC';CC"), one terminal (PVn') comprised within said first plurality receiving the said voltage delivered by said board power supply output terminal (BPSOT';BPSOT") being coupled to said first input terminal (1';1") of said card circuit (CC';CC"), said power supply sequencing circuit (PSSC') further including a second plurality of n−1 similar negative-on pass-gates (PMOS1', . . . ,PMOSn−1'), each of said similar negative-on pass-gates comprised in said second plurality (PMOS1', . . . ,PMOSn−1') being similar to said negative-on pass-gate (T1';T1") and having a control terminal coupled to said third output terminal (DT') of said card circuit (CC';CC"), a second terminal coupled to a distinct terminal comprised in said first plurality, except for said one terminal (PVn') of said first plurality receiving said most positive supply voltage, and a third terminal constituting an output terminal included in a third plurality of n−1 distinct supply voltage output terminals (PV1OUT', . . . ,PVn−1OUT') of said power supply sequencing circuit (PSSC'), said reference output terminal (20';20") of said card circuit (CC';CC") being coupled to a reference voltage output terminal (GNDOUT') of said power supply sequencing circuit (PSSC'), said power supply output terminal (10';10") of said card circuit being coupled to a further out terminal PVnOUT') of said power supply sequencing circuit (PSSC'), in that said connector means is further adapted to simultaneously couple, respectively decouple, each of said n distinct supply voltage input terminals of said power supply sequencing circuit (PSSC') comprised within said first plurality (PV1', . . . ,PVn'), to, respectively from, a corresponding fourth plurality of n distinct supply voltage board output terminals, said board power supply output terminal (BPSOTn') being included in said fourth plurality and being adapted to deliver its power supply voltage to said one terminal of said first plurality, via said connector means.

13. Power supply sequencing apparatus (PSSA') including at least one current control interface arrangement (CCIA';CCIA") according to claim 9, characterised in that said active device (T1';T1") is a negative-on pass gate and said switching means (T2';T2") is a negative-on switching means, in that said auxiliary voltage board terminal (PDVBTm'; PDVBTm") is delivering a voltage that is more negative with respect to the voltage delivered by said board power supply output terminal (BPSOT';BPSOT"), in that said card circuit (CC';CC") further includes a third output terminal (DT') coupled to said control electrode (G';G") of said negative on pass-gate, in that said card circuit (CC';CC") forms part of a power supply sequencing circuit (PSSC'), said power supply sequencing circuit (PSSC') receiving a first plurality of n distinct supply voltages, including one supply voltage at the value delivered by said board power supply output terminal (BPSOT';BPSOT") and including n−1 distinct supply voltages with values lower than the voltage delivered by said board power supply output terminal (BPSOTn';BPSOTn") and higher than the voltage delivered by said auxiliary voltage board terminal (PDVBTm';PDVBTm") at a corresponding first plurality of n distinct supply voltage input terminals (PV1', . . . PVn'), said power supply sequencing circuit (PSSC') further receiving a reference voltage at a reference input terminal (GND') coupled to said second input terminal (2';2") of said card circuit (CC';CC"), and an enable voltage at an enable terminal (EN') of said power supply sequencing circuit (PSSC'), being coupled to said enable input terminal (3';3") of said card circuit (Cc';CC"), one terminal (PVn') comprised within said first plurality receiving the said voltage delivered by said board power supply output terminal (BPSOT';BPSOT") being coupled to said first input terminal (1';1") of said card circuit (CC';CC"), said power supply sequencing circuit (PSSC') further including a second plurality of n−1 similar negative-on pass-gates (PMOS1', . . . ,PMOSn−1'), each of said similar negative-on pass-gates comprised in said second plurality (PMOS1', . . . ,PMOSn−1') being similar to said negative-on pass-gate (T1';T1")and having a control terminal coupled to said third output terminal (DT') of said card circuit (CC';CC"), a second terminal coupled to a distinct terminal comprised in said first plurality, except for said one terminal (PVn') of said first plurality receiving said most positive supply voltage, and a third terminal constituting an output terminal included in a third plurality of n−1 distinct supply voltage output terminals (PV1OUT', . . . ,PVn−1OUT') of said power supply sequencing circuit (PSSC'), said reference output terminal (20';20") of said card circuit (CC';CC") being coupled to a reference voltage output terminal (GNDOUT') of said power supply sequencing circuit (PSSC'), said power supply output terminal (10';10") of said card circuit being coupled to a further out terminal PVnOUT') of said power supply sequencing circuit (PSSC'), in that said connector means is further adapted to simultaneously couple, respectively decouple, each of said n distinct supply voltage input terminals of said power supply sequencing circuit (PSSC') comprised within said first plurality (PV1', . . . ,PVn'), to, respectively from, a corresponding fourth plurality of n distinct supply voltage board output terminals, said board power supply output terminal (BPSOTn') being included in said fourth plurality and being adapted to deliver its power supply voltage to said one terminal of said first plurality, via said connector means.

14. Power supply sequencing apparatus (PSSA') according to claim 13, characterised in that said power supply sequencing circuit (PSSC') further receives an auxiliary supply voltage equal to the value delivered by said auxiliary voltage board terminal (PDVBTm';PDVBTm") at a corresponding auxiliary supply input terminal (NVm') of said power supply sequencing circuit, being coupled to said fourth input terminal (4';4") of said card circuit (CC';CC"), said power supply sequencing circuit (PSSC') further including an additional switch circuit (D') coupled between said auxiliary supply input terminal (NVm') and an auxiliary output terminal (NVmOUT') of said power supply sequencing circuit (PSSC'), said additional switch circuit (D') being adapted to provide said auxiliary supply voltage to said auxiliary output terminal (NVmOUT') with a larger delay compared to the delivery of said n−1 distinct supply voltages lower than the value delivered by said board power supply output terminal (BPSOTn';BPSOTn") at said third plurality of n−1 distinct supply voltage output terminals (PV1OUT', . . . ,PVn−1OUT'), and to decouple said auxiliary output terminal (NVmOUT') from said auxiliary supply input terminal (Nvm'), before all similar pass gates of said second plurality are open, in that said connector means is further adapted to simultaneously couple, resp decouple, said auxiliary supply voltage input terminal (Nvm') to said auxiliary voltage board terminal (PDVBTm';PDVBTm") during the coupling, resp decoupling, of said n distinct supply voltage input terminals of said first plurality to said corresponding fourth plurality of n distinct supply voltage board output terminals.

15. Power supply sequencing apparatus (PSSA') according to claims 14, characterised in that said additional switch circuit (D') includes a positive-on pass gate (N1') a conductive path of which is coupled between said fourth terminal (4') of said card circuit (CC') and said auxiliary output terminal (NVmOUT') of said power supply sequencing circuit (PSSC'), in that said additional switch circuit (D') further includes an additional time constant means (RCD') having a first additional time constant means terminal (1RCD') coupled to a control electrode (GT1') of said positive on pass gate (N1'), a second additional time constant means terminal (2RCD') coupled to said power supply output terminal (10') of said card circuit (CC'), a third additional time constant means terminal (3RCD') coupled to said fourth input terminal (4') of said card circuit (CC'), said additional time constant means (RCD') being adapted for controlling the rate at which said positive on pass gate is rendered conductive in accordance with a predetermined time constant, in that said additional switch circuit (D') further includes a third card circuit output controlled switch (SWD'), a control terminal (GT2') of which is coupled to said third output terminal of said card circuit (DT'), a fixed terminal of which is coupled to said fourth input terminal (4') of said card circuit, an output terminal of which (SWDOUT') is coupled to said control electrode (GT1') of said positive on pass gate (N1').

16. Power supply sequencing apparatus according to claim 15, characterised in that said third card circuit output controlled switch (SWD') includes an n-type switching means (N2'), a gate terminal of which constitutes said control terminal (GT2') of said third card circuit output controlled switch (SWD'), a first conductive path terminal of which is coupled via an additional source degeneration resistor (RD2') to said fourth input terminal (4') of said card circuit (C'), a second conductive path terminal of which constitutes said output terminal (SWDOUT') of said third card circuit output controlled switch (SWD'), in that said additional time constant means (RCD') includes an additional resistor (RD1') coupled between said second additional time constant means terminal (2RCD') and said first additional time constant means terminal (1RCD'), and an additional capacitor (CD1') coupled between said first additional time constant means terminal (1RCD') and said third additional time constant means terminal (3RCD').

17. Current control interface arrangement according to claim 9, characterised in that said enable controlled switch (SW;SW') includes a switching means (T2; T2') a control terminal of said switching means (T2; T2') constituting said control terminal of said enable controlled switch, a variable terminal of said switching means (T2; T2') constituting said output terminal (SWOUT; SWOUT') of said enable controlled switch, a fixed terminal of said switching means (T2; T2') being coupled to said first input terminal (1; 1'), said enable controlled switch (SW; SW') further including an input resistor (R3; R3') coupled between said enable input terminal (3;3') and said second input terminal (2;2') of said card circuit.

* * * * *